United States Patent
Ishibashi et al.

(10) Patent No.: US 9,158,483 B2
(45) Date of Patent: Oct. 13, 2015

(54) RELAYING DEVICE AND SYSTEM THEREOF

(71) Applicant: BROTHER KOGYO KABUSHIKI KAISHA, Nagoya-shi, Aichi-ken (JP)

(72) Inventors: Masayuki Ishibashi, Nagoya (JP); Ken Saito, Tokoname (JP)

(73) Assignee: BROTHER KOGYO KABUSHIKI KAISHA, Nagoya-Shi, Aichi-Ken ( * ) Notice: Subject to any disclaimer, the term of this patent is extended or adjusted under 35 U.S.C. 154(b) by 0 days.

(21) Appl. No.: 14/466,202

(22) Filed: Aug. 22, 2014

(65) Prior Publication Data
US 2015/0055178 A1 Feb. 26, 2015

(30) Foreign Application Priority Data
Aug. 23, 2013 (JP) .................. 2013-173681

(51) Int. Cl.
*G06F 15/00* (2006.01)
*G06F 3/12* (2006.01)
*G06K 1/00* (2006.01)
*H04N 1/00* (2006.01)

(52) U.S. Cl.
CPC ............ *G06F 3/1206* (2013.01); *G06F 3/1256* (2013.01); *G06F 3/1257* (2013.01); *G06F 3/1258* (2013.01); *G06F 3/1288* (2013.01); *H04N 1/00* (2013.01)

(58) Field of Classification Search
CPC ... G06F 3/1206; G06F 3/1256; G06F 3/1257; G06F 3/1258; G06F 3/1288; H04N 1/00
USPC .......................... 358/1.1, 1.15, 1.13
See application file for complete search history.

(56) References Cited

U.S. PATENT DOCUMENTS

| 8,634,102 B2 * | 1/2014 | Shiohara ............ 358/1.18 |
| 2012/0133977 A1 * | 5/2012 | Sunata ............ 358/1.15 |

FOREIGN PATENT DOCUMENTS

JP        2008-229993      10/2008

* cited by examiner

*Primary Examiner* — Douglas Tran
(74) *Attorney, Agent, or Firm* — Merchant & Gould PC

(57) ABSTRACT

A relaying device may send, to the image processing device, first screen information for causing a first screen to be displayed on a display unit of an image processing device. The first screen may be configured to receive selection as to whether to execute a second print process or a first print process at the image processing device. The second print process may be process using print information received by the image processing device and performed prior to the second print process. The relaying device may send first print information used for the first print process to the image processing device in a case that first process-identification information is received from the image processing device. The relaying device may send second print information used for the second print process to the image processing device in a case that second process-identification information is received from the image processing device.

20 Claims, 15 Drawing Sheets

RELAYING DEVICE AND SYSTEM THEREOF

CROSS-REFERENCE TO RELATED APPLICATION

This application claims priority to Japanese Patent Application No. 2013-173681, filed on Aug. 23, 2013, the contents of which are hereby incorporated by reference into the present application.

TECHNICAL FIELD

The present specification discloses a relaying device connected with an image processing device via a network.

DESCRIPTION OF RELATED ART

A known image processing device has a web browser integrated therein, and has a function for downloading and printing a web page. Further, the image processing device has a function for sending scan data, which was created by scanning a document and converted to a predetermined format such as a Joint Photographic Experts Group (referred to as JPEG) format, to a web server.

SUMMARY

In the present specification, a novel technique is disclosed for causing an image processing device to obtain print information, and to cause the image processing device to execute a print process using the obtained print information.

In one aspect of the teachings disclosed herein, a relaying device may be provided. The relaying device may comprise: a network interface configured to connect with a network; a processor coupled to the network interface; and a memory storing computer-readable instructions. The computer-readable instructions, when executed by the processor, may cause the relaying device to perform sending, to the image processing device via the network interface, first screen information for causing a first screen to be displayed on a display unit of an image processing device which is connected with the network. The first screen information may include an instruction to display the first screen for receiving selection as to whether to execute a first print process or a second print process at the image processing device. The second print process may be a process using print information received from the network by the image processing device. The first print process may be performed prior to the second print process. The computer-readable instructions may cause the relaying device to perform sending first print information used for the first print process to the image processing device via the network interface in a case that first process-identification information indicating execution of the first print process is received via the network interface from the image processing device, after sending the first screen information. The computer-readable instructions may cause the relaying device to perform sending second print information used for the second print process to the image processing device via the network interface in a case that second process-identification information indicating execution of the second print process is received via the network interface from the image processing device, after sending the first screen information.

EMBODIMENT (System Configuration)

Figure 1:
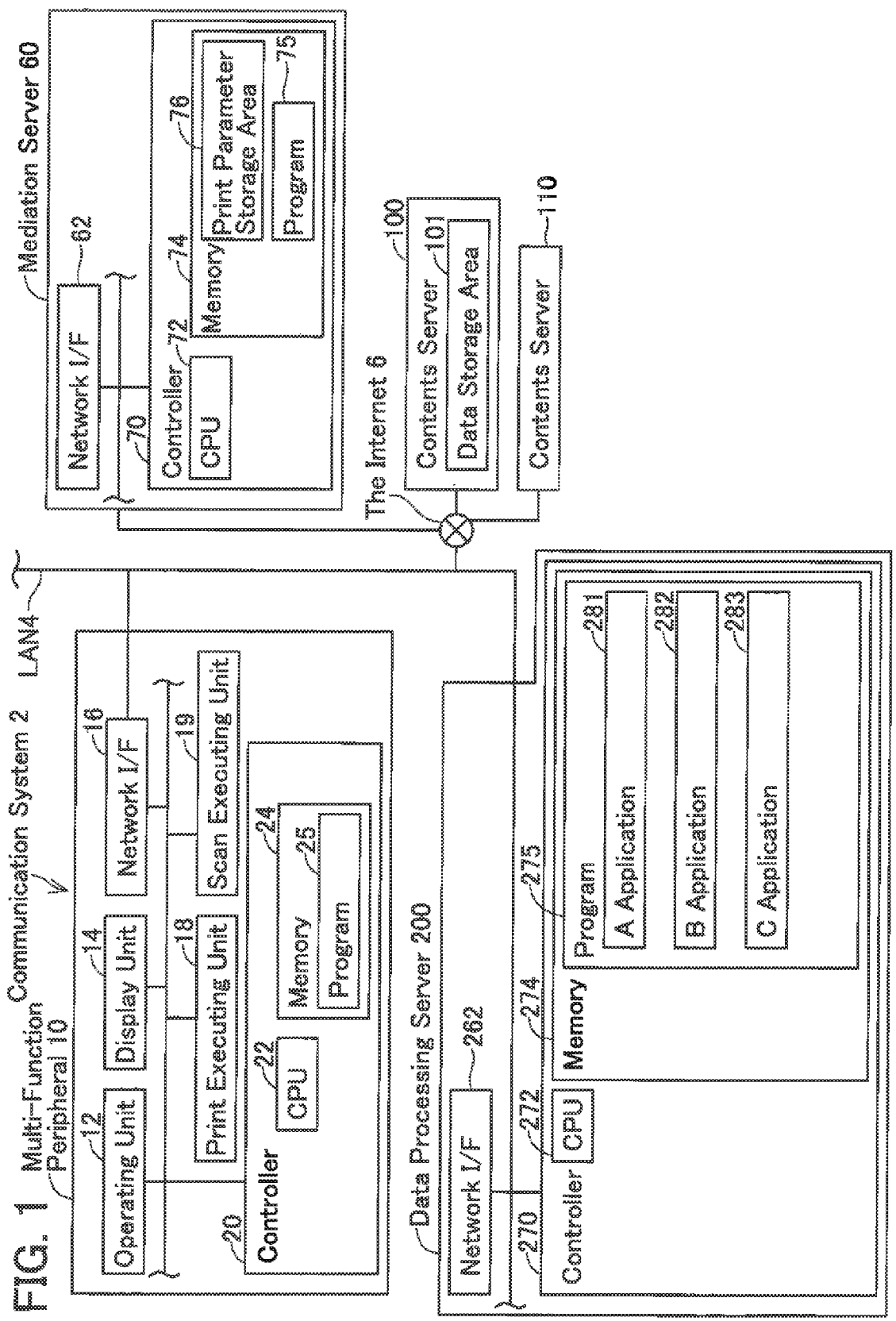
FIG. 1 shows the configuration of a communication system.
Figure 2:
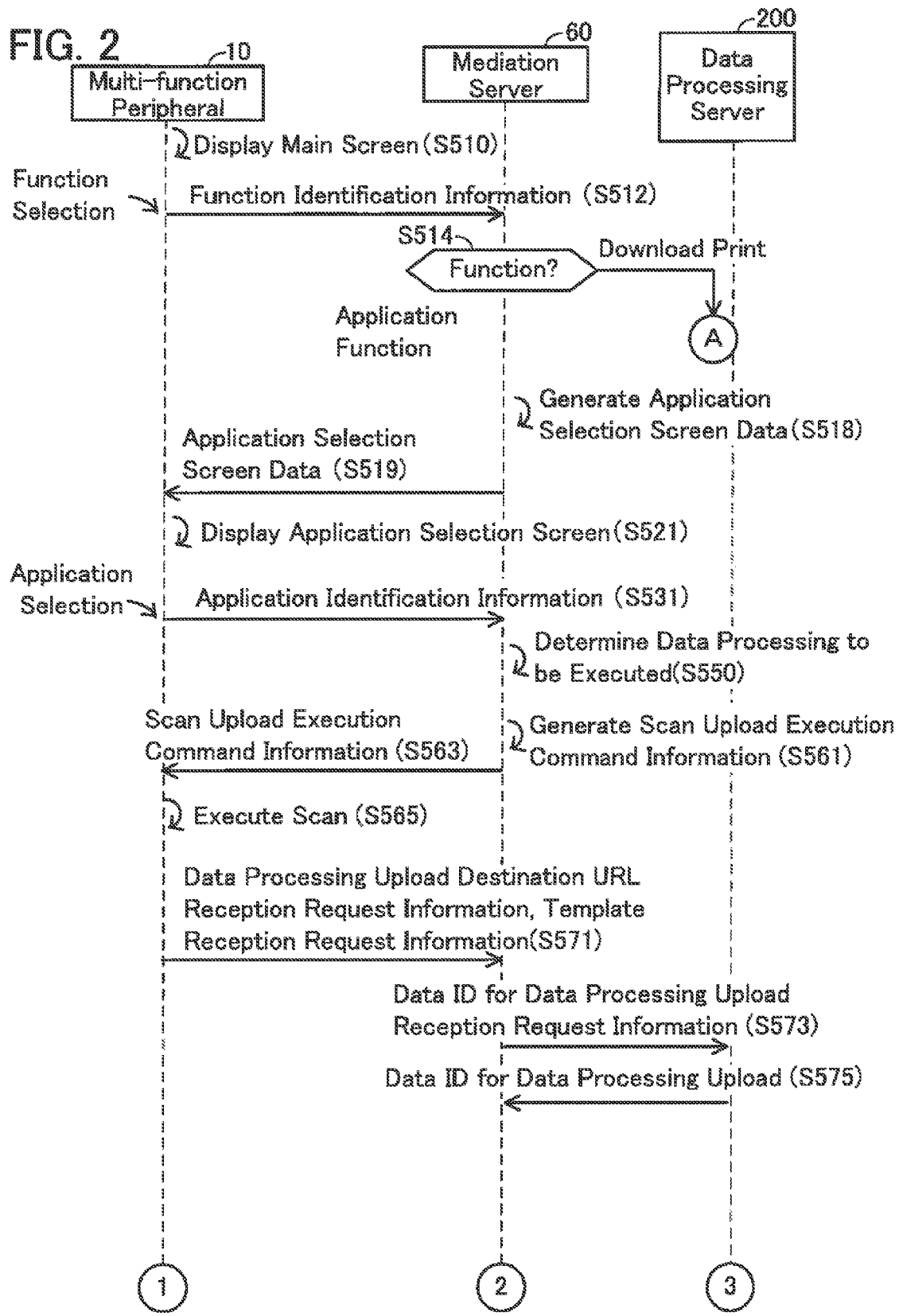
FIG. 2 shows a sequence diagram of various processing executed by each device.
Figure 3:
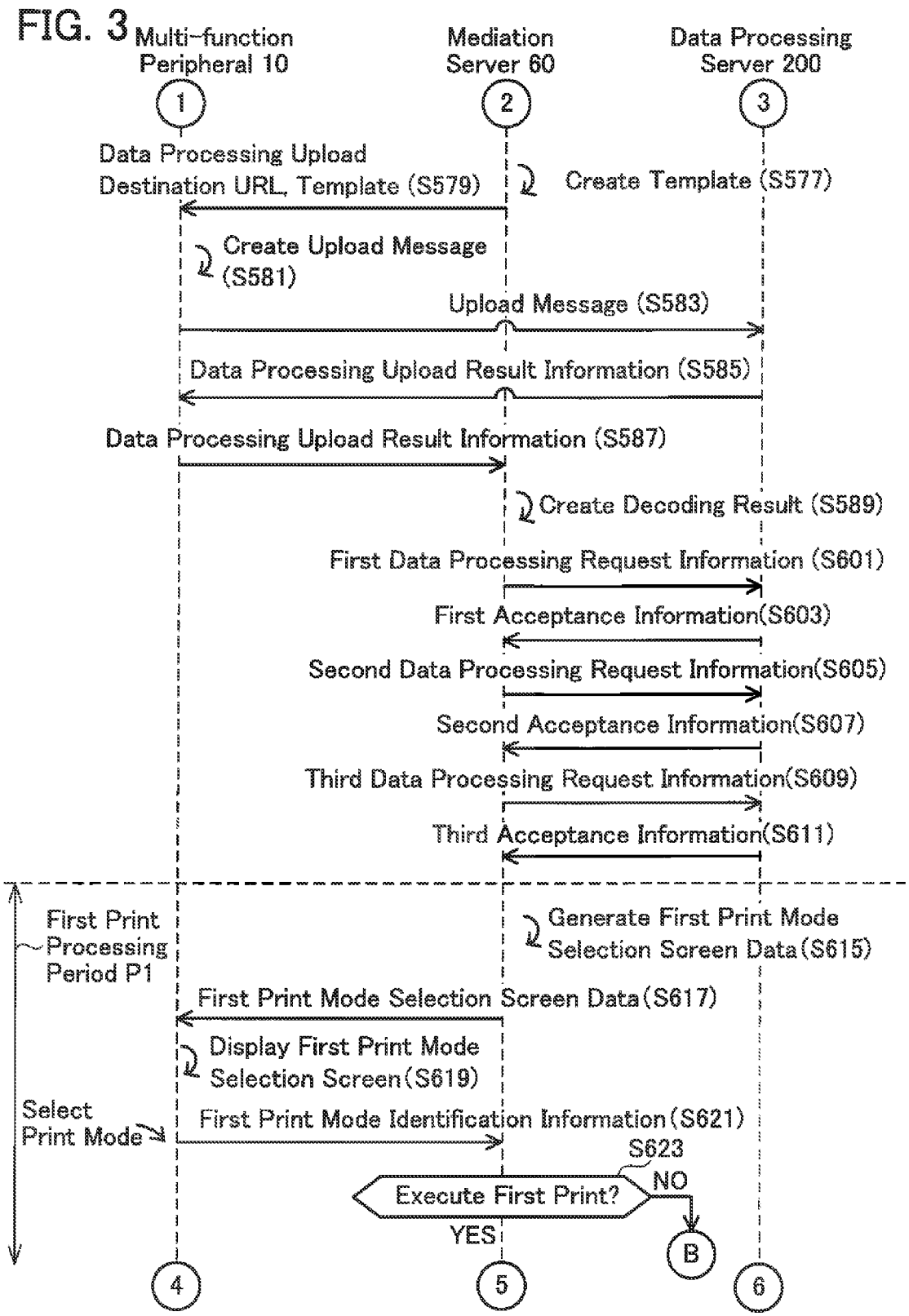
FIG. 3 shows a sequence diagram of various processing executed by each device.
Figure 4:
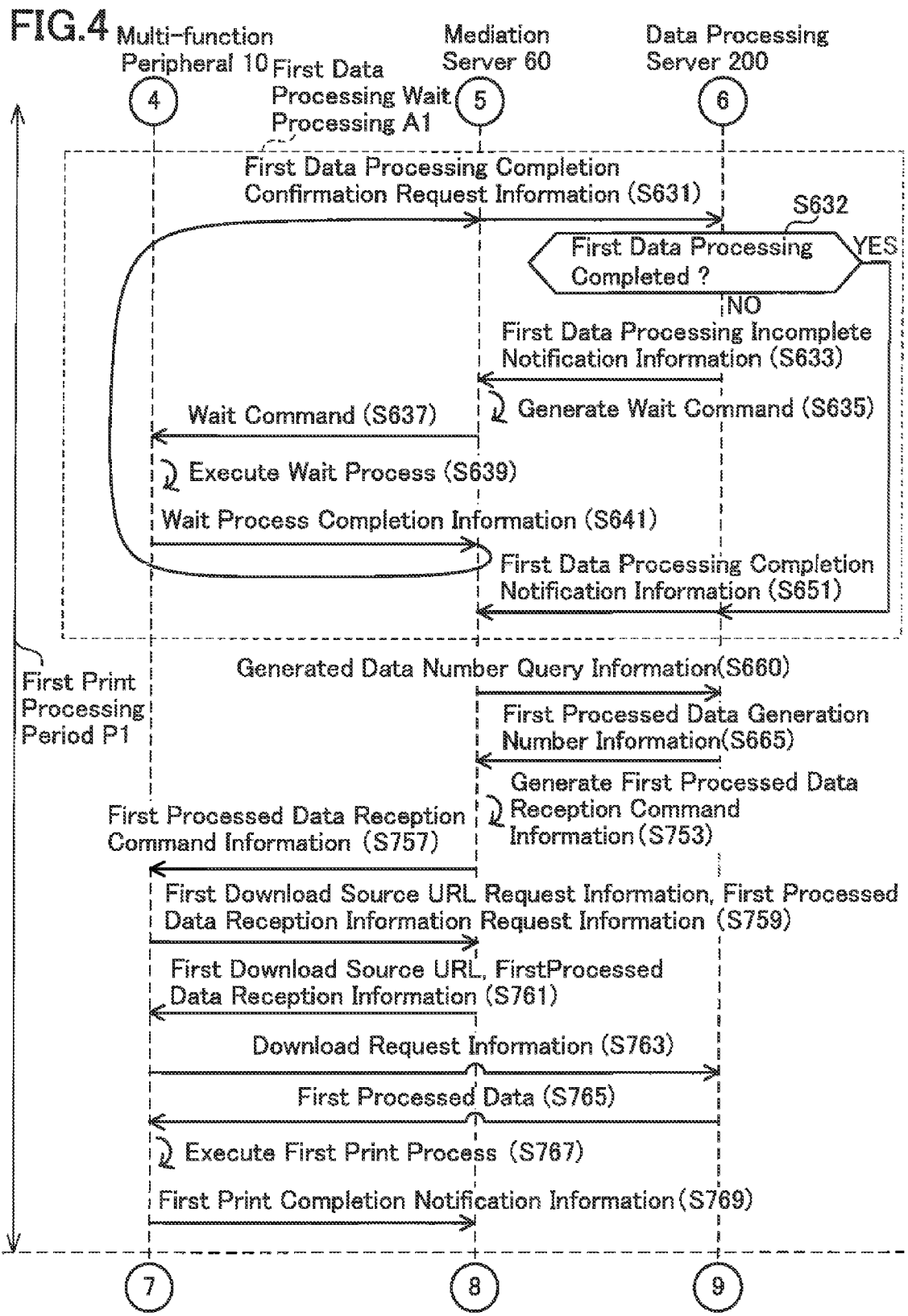
FIG. 4 shows a sequence diagram of various processing executed by each device.
Figure 5:
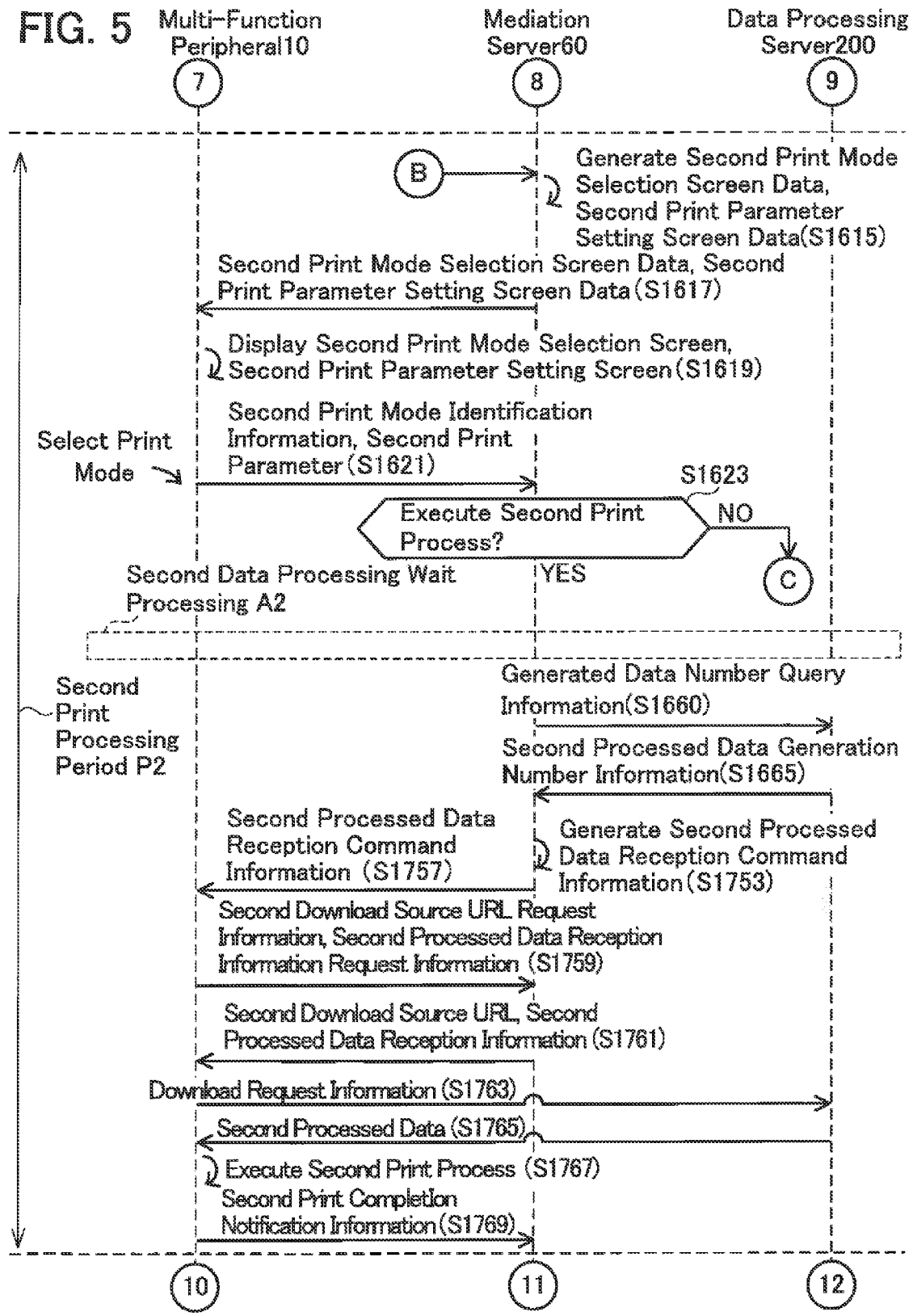
FIG. 5 shows a sequence diagram of various processing executed by each device.
Figure 6:
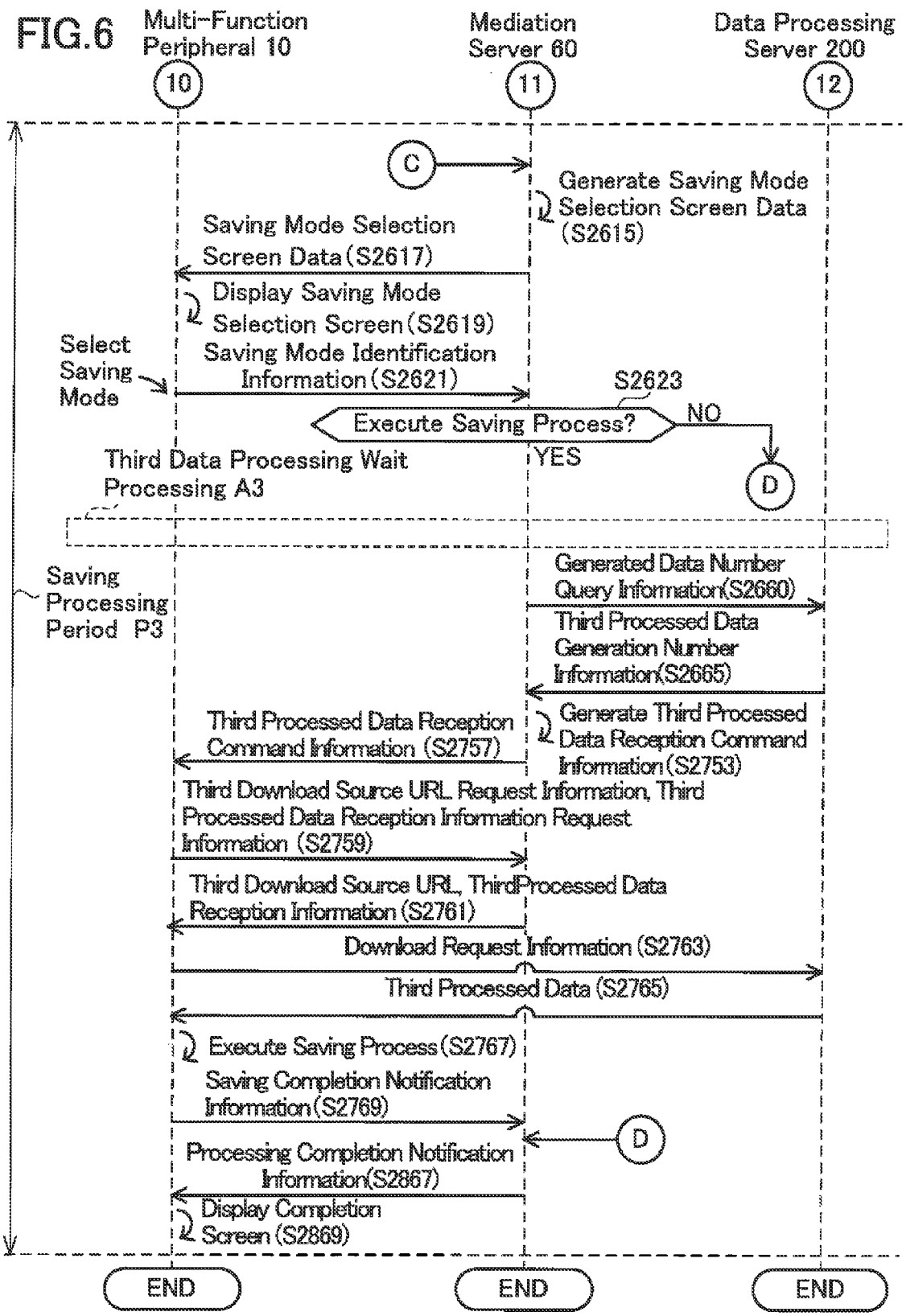
FIG. 6 shows a sequence diagram of various processing executed by each device.

As shown in FIG. 1, a communication system 2 includes a multi-function peripheral 10, a mediation server 60, contents servers 100 and 110 and a data processing server 200. The multi-function peripheral 10 is connected with the Internet 6 via a LAN 4. The mediation server 60, the contents servers 100 and 110 and the data processing server 200 are connected with the Internet 6.

The multi-function peripheral 10, the mediation server 60, and the data processing server 200 perform communication by, e.g., HTTP (referred to as HyperText Transfer Protocol) or HTTPS (referred to as HyperText Transfer Protocol Secure). More specifically, the multi-function peripheral 10 operates as a HTTP client. The data processing server 200 operates as a HTTP server. On the other hand, the mediation server 60 operates as a HTTP server in communication with the multi-function peripheral 10, and operates as a HTTP client in communication with the data processing server 200, thereby being capable of executing communication with the multi-function peripheral 10 and communication with the data processing server 200 without being obstructed by a firewall or the like provided in the LAN 4, etc.

(Structure of Multi-Function Peripheral 10)

The multi-function peripheral 10 may execute a Printing function, a Scan function, a Copy function, a FAX function, or the like. The multi-function peripheral 10 comprises an operating unit 12, a display unit 14, a network interface (described as "I/F," hereinafter) 16, a print executing unit 18, a scan executing unit 19, and a controller 20. The operating unit 12 has a plurality of keys. A user can input various instructions to the multi-function peripheral 10 by operating the operating unit 12. The display unit 14 is a display for displaying various pieces of information. The network I/F 16 is connected to the LAN 4. The multi-function peripheral 10 is capable of communicating with the mediation server 60, the data processing server 200, etc. via the network I/F 16. The print executing unit 18 comprises an inkjet or laser printing mechanism. The scan executing unit 19 comprises a scan mechanism such as a CCD or CIS. The controller 20 comprises a CPU 22 and a memory 24.

A program 25 is included in the memory 24. The CPU 22 executes various processes in accordance with program 25 stored in the memory 24. The memory 24 may be a computer readable storage medium. The computer readable storage medium is a non-transitory medium, such as a ROM, RAM, flash memory, hard disk, etc. An electrical signal carrying a program to be downloaded from a server, etc. on the Internet is not included in the non-transitory medium.

(Structure of Mediation Server 60)

The mediation server 60 is a server independent of the data processing server 200 and the contents servers 100 and 110. The mediation server 60 is a server for mediating communication of various data between the data processing server 200 and the multi-function peripheral 10. The mediation server 60 is a server provided by a vendor or a manufacturer of the multi-function peripheral 10. The mediation server 60 includes a network I/F 62 and a controller 70. The mediation server 60 is capable of communicating with the multi-function peripheral 10, the contents servers 100 and 110, the data processing server 200, etc. via the network I/F 62. The controller 70 comprises a CPU 72 and a memory 74. A program 75 and a print parameter storage area 76 are stored in the memory 74. The CPU 72 executes various processes in accordance with the program 75. As with the memory 24, the memory 74 may be a computer readable storage medium.

The print parameter storage area 76 is an area for storing a first print parameter. The first print parameter is information for instructing various print settings in a first print process, to be described. Examples of the print setting are printing paper size (e.g., A4 size, postcard size), printing paper type (e.g., normal paper, inkjet paper, glossy paper), print resolution (e.g., high, medium, low), and print mode (e.g., color mode, monochrome mode). The first print parameter may be set in advance by a user or the like. The first print parameter may be set such that, for example, printing paper size is "A4 size", printing paper type is "normal paper", print resolution is "low", and print mode is "color mode".

(Structure of the First Data Processing Server 200)

The data processing server 200 is a server configured as a separate entity from the mediation server 60 and the contents servers 100 and 110. The data processing server 200 may be a server which is provided to a vendor of the multi-function peripheral 10. The data processing server 200 comprises a network interface 262 and a controller 270. The controller 270 comprises a CPU 272 and memory 274. As with the memory 24, the memory 274 may be a computer readable storage medium. The memory 274 stores a program 275. The CPU 272 executes various processing according to the program 275. The program 275 includes an A application 281, a B application 282, and a C application 283. The A application 281 to the C application 283 are applications configured to execute various image processing, such as image synthesis processing, image format conversion processing, etc.

(Structure of Contents Servers 100 and 110)

The contents servers 100 and 110 each are a server used for an online service provided by the vender of the multi-function peripheral 10. The contents servers 100 and 110 are so called storage servers. Note that the contents servers 100 and 110 may be servers used for an online service for lending file storage areas of the respective contents servers 100 and 110 to a user. The online service includes "Evernote (registered trademark of Evernote Corporation)", "Google (registered trademark of Google, Inc.) Docs", "PICASA (registered trademark of Google, Inc.), "FACEBOOK (registered trademark of Facebook, Inc.)", etc. A user of the online service can upload or download various data to or from a storage area assigned to the user via the Internet 6. The contents server 100 comprises a data storage area 101. The data storage area 101 is an area storing various data. The various data stored in the data storage area 101 may be described as contents data.

Some features relating to the description in the present specification are hereby explained. In the present specification, the description "the CPU 72 of the mediation server 60 receives various information" includes the technical meaning "the CPU 72 of the mediation server 60 receives various information via the network interface 62". Further, the description "the CPU 72 of the mediation server 60 sends various information" includes the technical meaning "the CPU 72 of the mediation server 60 outputs various information via the network interface 62". Similar features exist regarding the CPU 272 of the data processing server 200 and the network interface 262. Similar features exist regarding the CPU 22 of the multi-function peripheral 10 and the network interface 16.

Here, a definition of the words "data" and "information" will be explained. In the present specification, "information" is used as a concept superordinate to "data". Consequently, "A data" may be rephrased as "A information". Further, even if the "information" has a different format as "data" (e.g., text format, binary format, flag format, etc.), this is treated as the same information as long as it is recognized that the meaning is the same. For example, as long as the device treats this as information indicating that the number of print copies is two parts, data of the text format "COPY=2", and data of the binary format "10" are the same information.

In the present specification, a case is explained in which the mediation server 60, the data processing server 200 and the contents servers 100 and 110 are connected by the Internet 6 (that is, when a device functioning as the mediation server 60, a device functioning as the data processing server 200 and devices functioning as the contents servers 100 and 110 are disposed at physically distant positions), but other configurations are possible. The mediation server 60 and the data processing server 200 may be realized as a single server. In this case, in the single server, a program which functions as the mediation server 60 and a program which functions as the data processing server 200 run, and communication between the programs is performed via a bus in the server. When the mediation server 60 and the data processing server 200 are realized as a single server, in the present specification, communication which is explained as communication between the mediation server 60 and the data processing server 200 may be taken to mean communication between the program which functions as the mediation server 60 and the program which functions as the data processing server 200. Further, a configuration may be realized in which a program which functions as the mediation server 60, and moreover also functions as the data processing server 200, runs on a single server. In this case, in the present specification, communication which is explained as communication between the mediation server 60 and the data processing server 200 may replaced with passing of data within the program which functions as the mediation server 60 and which moreover functions as the data processing server 200.

(Operation of Communication System)

Figure 10:
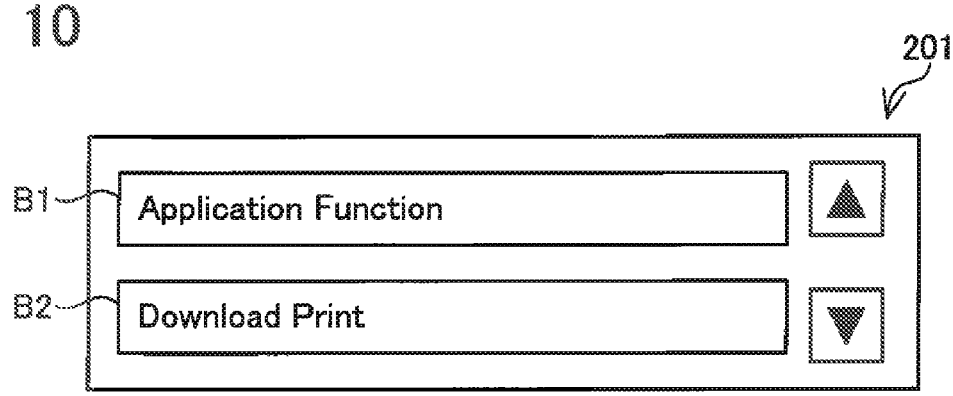
FIG. 10 shows an example of a main screen display.

Operation of the communication system 2 will be described using sequence diagrams of FIGS. 2 to 9. In receiving a command for displaying a main screen, the CPU 22 of the multi-function peripheral 10 cause the display unit 14 to display the main screen in S510. The command for displaying the main screen may be input from the operating unit 12 by a user. Data for displaying the main screen may be preliminarily stored in the memory 24. An example of the main screen 201 is shown in FIG. 10. The main screen 201 includes button images B1 and B2. The button images B1 and B2 are images for receiving an input of an execution order among a plurality of functions. A function received by the button image B1 is an application function. The application function is a function that performs applied processing, such as a process for generating an image for an address side or back side of a postcard. A function received by the button image B2 is a download print. The download print is a function that executes a printing based on data that was downloaded from the contents server to the multi-function peripheral 10.

When an operation of selecting the button image B1 or B2 is executed in the multi-function peripheral 10, in S512 the CPU 22 sends function identification information to the mediation server 60. The function identification information is information indicating a function associated with the selected button image. An example of the function identification information is "application function", which is the name of the button image B1. That is, the function identification information may be information indicating the selected button.

In receiving function identification information from the multi-function peripheral 10, in S514 the CPU 72 of the mediation server 60 determines a function indicated by the function identification information. In case the application function is indicated (S514: application function), the process proceeds to S929. In case the application function is indicated (S514: application function), the process proceeds to S518. In S518, the CPU 72 specifies an application selection screen 211 as the screen data to be sent next to the multi-function peripheral 10. The application selection screen 211 is a screen for receiving selection of one or more applications among the plurality of the application functions.

In S518, the CPU 72 of the mediation server 60 generates application selection screen data for causing the application selection screen 211 to be displayed. Information (not shown) indicating which type of information should be included in the application selection screen data is stored in the memory 74. The CPU 72 of the mediation server 60 generates the application selection screen data according to this information. The following is included in the application selection screen data: information indicating that button images B11 to B13 are included in the application selection screen 211; information indicating that a screen for selecting one of the button images B11 to B13 is displayed; information indicating that "A application", "B application", "C application" correspond respectively to the respective button images B11 to B13; and information indicating a character string to be attached to the button images B11 to B13 and displayed. In S519, the CPU 72 of the mediation server 60 sends the application selection screen data to the multi-function peripheral 10.

Figure 11:
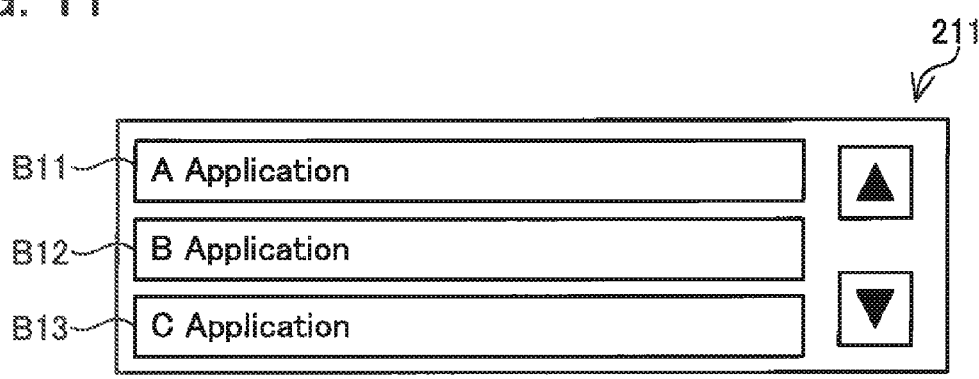
FIG. 11 shows an example of an application selection screen display.

In receiving the application selection screen data from the mediation server 60, in S521 the CPU 22 of the multi-function peripheral 10 causes the application selection screen 211 to be displayed on the display unit 14. As shown in FIG. 11, the application selection screen 211 includes the button images B11 to B13. Each of the button images B11 to B13 is an image for receiving selection of the application functions of each of the A application 281 to the C application 283.

Moreover, information for accessing bitmap information for displaying an image of the button images B11 to B13 is included in the application selection screen data received from the mediation server 60. Based on this information, the CPU 22 obtains the bitmap information from the mediation server 60, and causes the application selection screen 211 to be displayed on the display unit 14. Consequently, it is not necessary to include the bitmap information for displaying an image of the button images B11 to B13 in the application selection screen data. The user operates the operating unit 12 to select a button image representing a desired application from the application selection screen 211.

When the operation of selecting the button image in the multi-function peripheral 10 is performed, in S531 the CPU 22 of the multi-function peripheral 10 sends application identification information to the mediation server 60. The application identification information is information for identifying the selected application function. An example of the application identification information is the name of the application function. That is, the application identification information may be information indicating the selected button.

In S550, the CPU 72 of the mediation server 60 determines the data processing to be executed by the data processing server 200. An example of the data processing to be executed by the data processing server 200 is first to third data processings, to be described. The data processing to be executed by the data processing server 200 may be registered in advance in the mediation server 60 by the user or the like of the multi-function peripheral 10. In an illustrative example of the present embodiment, a case is described in which it is determined that the first to third data processings are the data processings to be executed by the data processing server 200.

In S561, the CPU 72 generates scan upload execution command information. The scan upload execution command information is information commanding the multi-function peripheral 10 to execute uploading of upload data generated by a scan process to the data processing server 200. In S563, the CPU 72 sends the scan upload execution command information to the multi-function peripheral 10. In S565, the CPU 22 of the multi-function peripheral 10 executes a scan of an image. Specifically, the user sets a paper, on which a prescribed image has been recorded, on the scan executing unit 19, and presses a start reading button of the operating unit 12, whereupon the CPU 22 uses the scan executing unit 19 to read the image recorded on the paper, and creates the upload data from the image data that was read.

In S571, the CPU 22 sends data processing upload destination Uniform Resource Locator (referred to as URL) reception request information and template reception request information to the mediation server 60. The "data processing upload" is a process for uploading various data, for data processing, to the data processing server 200. The data processing upload destination URL reception request information is information for requesting a data processing upload destination URL, this being information needed for uploading to the data processing server 200. The template reception request information is information for requesting a template of an upload message (to be described).

In S573, the CPU 72 of the mediation server 60 sends data ID for data processing upload reception request information to the data processing server 200. The data ID for data processing upload reception request information is information for requesting, from the data processing server 200, a data ID for data processing upload, this being for identifying the upload data uploaded to the data processing server 200. In S575, the CPU 272 of the first data processing server 200 sends the data ID for data processing upload to the mediation server 60.

In S577, the CPU 72 creates a template for an upload message. A template for an upload message is a template for a message when uploading upload data to the data processing server. In S579, the CPU 72 sends a data processing upload destination URL and upload message template to the multi-function peripheral 10. An example of the data processing upload destination URL is the URL of the data processing server 200.

In S581, the CPU 22 creates an upload message based on the received template, the received data processing upload destination URL, and the upload data created in S565. Specifically, the multi-function peripheral 10 stores binary data as the upload data, the data processing upload destination URL, the data size of the upload data, and various other information at prescribed positions in the template received from the mediation server 60. By this means, an upload message suitable for the data processing server 200 can be created.

In S583, the CPU 22 sends the upload message to the data processing server 200. In S585, the CPU 272 of the data processing server 200 sends data processing upload result information to the multi-function peripheral 10. The data processing upload result information is information indicating whether the upload data was normally uploaded to the data processing server 200. In S587, the CPU 22 of the multi-function peripheral 10 transfers the received data processing upload result information to the mediation server 60.

In S589, the CPU 72 of the mediation server 60 decodes the data processing upload result information and creates a decoding result. The data processing upload result information is information sent from the data processing server 200 to the multi-function peripheral 10, and thus has specifications particular to the data processing server 200. Hence by using a decoding program, not shown, included in the program 75 stored by the mediation server 60, the data processing upload result information can be decoded. A decoding result is a message in a format decodable by the multi-function peripheral 10. The decoding result includes a data processing upload result included in the decoded data processing upload result information.

In S601, the CPU 72 sends first data processing request information to the data processing server 200. The first data processing request information is information for requesting the first data processing to be executed on the upload data uploaded to the data processing server 200 in S583, and first image data to be generated. The contents of the first image data will be described later. If a plurality of upload data exists, the execution of the first data processing may be requested for one piece of upload data among the plurality of upload data. In this case, the execution of the first data processing may be requested for upload data corresponding to a first page.

In S603, the CPU 72 receives first acceptance information from the data processing server 200. The first acceptance information is information for notifying that an execution request of the first data processing has been accepted. The first acceptance information may include a first data processing job ID which is information for identifying the first data processing.

In S605, the CPU 72 sends second data processing request information to the data processing server 200. The second data processing request information is information for requesting the second data processing to be executed on the upload data uploaded to the data processing server 200 in S583, and second image data to be generated. The contents of the second image data will be described later. In S607, the CPU 72 receives second acceptance information from the data processing server 200. The second acceptance information is information for notifying that an execution request of the second data processing has been accepted. The second acceptance information may include a second data processing job ID which is information for identifying the second data processing.

In S609, the CPU 72 sends third data processing request information to the data processing server 200. The third data processing request information is information for requesting the third data processing to be executed on the upload data uploaded in S583 to the data processing server 200, and third image data to be generated. The contents of the third image data will be described later. In S611, the CPU 72 receives third acceptance information from the data processing server 200. The third acceptance information is information for notifying that an execution request of the third data processing has been accepted. The third acceptance information may include a third data processing job ID which is information for identifying the third data processing.

The first to third data processing request information may be described by a URL description method.

Figure 18:
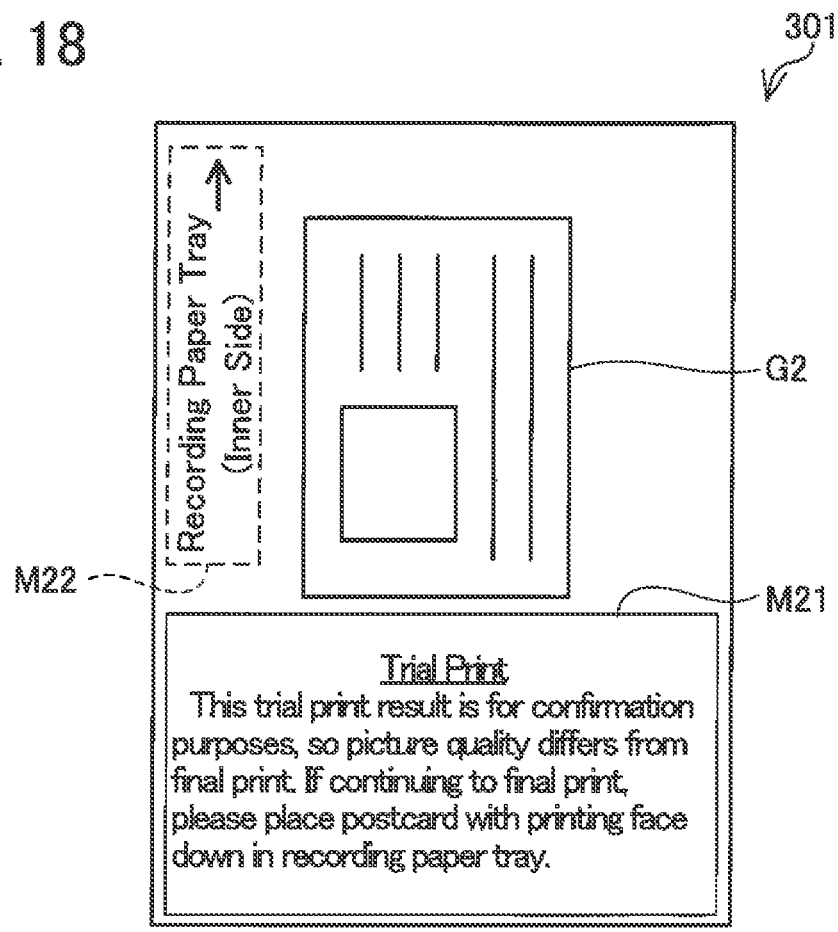
FIG. 18 shows an example of a first print result.
Figure 19:
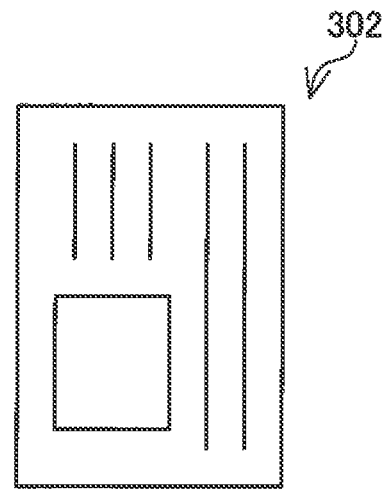
FIG. 19 shows an example of a second print result.

Contents of first to third image data will be described. The first image data is data used in a first print process. The second image data is data used in a second print process. The first print process is a process executed prior to the second print process. A first print result 301, which is an example of a print result obtained in the first print process, is shown in FIG. 18. A second print result 302, which is an example of a print result obtained in the second print process, is shown in FIG. 19. The first print result 301 is created using A4 size printing paper, which is the most common paper size. The second print result 302 is created using postcard size printing paper. A second print image G2 and message images M21, M22 are included in the first print result 301. The second print image G2 is an image in which an image the same as the image of the second print result 302 (see FIG. 19) is printed in postcard size, this being the paper size used in the second print process. By forming the first print result 301 before forming the second print result 302, it is possible to confirm the print mode in the second print result 302.

The message image M21 is an image for notifying the user that the first print result 301 is for confirming the print mode in the second print result 302. In other words, the message image M21 is an image for notifying the user that the first print process and the second print process are different print processes, and the first print result 301 is a result created by the first print process. Further, the message image M21 is an image for notifying the user of a method of positioning a printing paper when the second print process is to be executed. An example of the image for notifying the user of the method of positioning the printing paper is an image including a character string "If proceeding to final printing, please set postcard with printing face down in recording paper tray". A "final" printing herein refers to printing that is performed to print out a final printed product. The term "final" printing is used as an antonym of "trial" printing. The message image M22 is an image for notifying the user of a printing direction of the image to be printed in the second print process. In the first print result 301 of FIG. 18, the message image M22 indicates that a top side of the printing paper corresponds to an inner side of the recording paper tray. Since the paper size of the first print result 301 is larger than the paper size of the second print result 302, an area in which the second print image G2 is printed, and a blank area are formed in the first print result 301. The message images M21 and M22 are printed in this blank area. Thus, when the print mode of the second print image G2 is to be confirmed, the presence of the message images M21 and M22 does not impede the confirmation operation.

Print quality of the first print result 301 may be lower than print quality of the second print result 302. For example, the first print result 301 may have a lower print resolution than the second print result 302. Further, for example, a grade (e.g., normal paper) of the printing paper used for printing the first print result 301 may be lower than a grade (e.g., inkjet paper) of the printing paper used for printing the second print result 302.

The third image data is data used in a saving process. The saving process is a process for storing image data in memory 24 of the multi-function peripheral 10. The third image data is data that is generated by converting the data format of the second image data to a data format suitable for storage in the multi-function peripheral 10. An example of the data format of the third image data is JPEG format, PNG format, etc.

In S601, S605, S609, three processings, these being the first to third data processings, are executed on the upload data in common. The first to third data processings may be executed in parallel in the data processing server 200, or may be executed serially. The upload data which is a source of the processings may be stored in the data processing server 200 for a prescribed period (e.g., 1 hour) for completing all the first to third data processings.

Processing contents of a first print processing period P1 (S615 to S769) will be described. The first print processing period P1 is a period for executing the first print process. In S615, the CPU 72 generates first print mode selection screen data for causing a first print mode selection screen 212 to be displayed. In S617, the CPU 72 sends the first print mode selection screen data to the multi-function peripheral 10.

Figure 12:
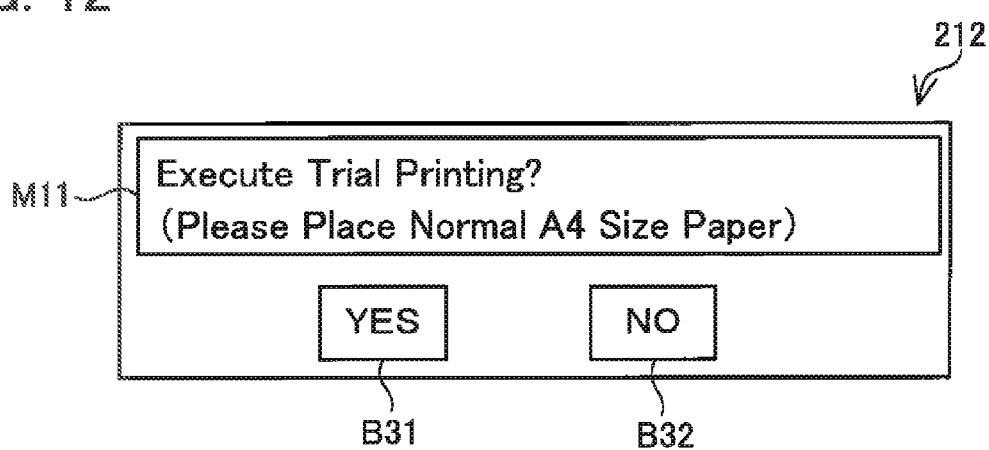
FIG. 12 shows an example of a first print mode selection screen display.

When receiving the first print mode selection screen data from the mediation server 60, in S619 the CPU 22 of the multi-function peripheral 10 causes the first print mode selection screen 212 to be displayed on the display unit 14. FIG. 12 shows an example of the first print mode selection screen 212. The first print mode selection screen 212 includes a message image M11 and button images B31, B32. The message image M11 is an image for requesting the user to select whether to execute the first print process as a trial printing of the second print process. Further, the button images B31 and B32 are images for receiving selection of whether to execute the first print process.

The user operates the operating unit 12 to select the button image B31 or B32. In S621, the CPU 22 sends first print mode identification information, for identifying the instruction contents of the user, to the mediation server 60. In S623, the CPU 72 of the mediation server 60 determines whether the instruction contents of the user instruct execution of the first print process. When a negative determination is made (S623: NO), the process proceeds to S1615, and when a positive determination is made (S623: YES), the process proceeds to S631.

In S631 to S651, first data processing wait processing A1 is executed. The first data processing wait processing A1 is a process causing the multi-function peripheral 10 to wait until the completion of the first data processing when the first data processing is being executed on the upload data. The data processing server 200 executes the first data processing on the upload data in response to the first data processing request information received in S601. The first data processing may be executed on each of upload data divided into prescribed data amounts (e.g., 100 KB).

In S631, the CPU 72 of the mediation server 60 sends first data processing completion confirmation request information to the data processing server 200. The first data processing completion confirmation request information is information for confirming with the data processing server 200 whether the first data processing requested from the data processing server 200 in S601 has been completed. In order to identify the first data processing, the CPU 72 includes, in the first data processing completion confirmation request information, the first acceptance information sent by the data processing server 200 in S603.

In S632, the CPU 272 of the data processing server 200 determines whether the first data processing has been completed. Specifically, the first data processing is specified based on the first acceptance information included in the first data processing completion confirmation request information Then, it is determined whether the conversion of a prescribed data amount from a beginning part of the upload data has been completed in the specified first data processing. Specifically, in regards to the data processing executed for 100K bytes at a time, it is determined whether this processing of 100K bytes has been completed; and similarly, in regards to the data processing that processes all the upload data, it is determined whether the data processing for all the upload data has been completed. In case the first data processing has not been completed (S632: NO), the process proceeds to S633.

In S633, the CPU sends to the mediation server 60 first data processing incomplete notification information indicating that the first data processing has not completed. In S635, the CPU 72 of the mediation server 60 generates a wait command in response to the reception of the first data processing incomplete notification information. The wait command is a command to cause the multi-function peripheral 10 to wait for the completion of the first data processing.

In S637, the CPU 72 sends the wait command to the multi-function peripheral 10. In S639, the CPU 22 of the multi-function peripheral 10 executes wait processing to wait for the completion of the first data processing. The wait processing may for example be processing in which a timer which had been started to detect a timeout of the first data processing is reset and again started. Or, for example, the wait processing may be processing in which the time until timeout of data processing is lengthened by increasing the timeout time stored in memory 24 such that the time until timeout of data processing is extended.

In S641, the CPU 22 sends to the mediation server 60 the wait processing completion information indicating that wait processing execution has completed. Then the process returns to S631.

However, when in S632 it is determined that the first data processing has completed (S632: YES), the process proceeds to S651. In S651, the CPU 272 of the data processing server 200 sends to the mediation server 60 the first data processing completion notification information indicating that the first data processing of a prescribed data amount in the leading portion of the upload data has completed.

In S660, the CPU 272 of the mediation server 60 sends generated data number query information to the data processing server 200. The generated data number query information is information for enquiring, from the data processing server 200, about the number of pieces of first processed data that have been generated by the first data processing. In S665, the CPU 272 receives, from the data processing server 200, first processed data generation number information indicating the number of pieces of first processed data that were generated.

The process S753 to S769 is a process for causing the multi-function peripheral 10 to print the first processed data generated by the first data processing. In S753, the CPU 72 of the mediation server 60 generates first processed data reception command information. The first processed data reception command information is information for causing the multi-function peripheral 10 to obtain the first processed data from the data processing server 200. The first processed data reception command information is also information for notifying the multi-function peripheral 10 that the first data processing of a prescribed data amount from the beginning part has been completed (S632: YES). Further, a first print parameter being stored in the print parameter storage area 76, and first processed number information are added to the first processed data reception command information. The first processed number information is the number of pieces of first processed data that undergoes the print process. The number of pieces of first processed data instructed by the first processed number information may be "1" regardless of the generated number of pieces of first processed data or the number of print copies of the second print process (S1767). Further, the first processed data reception command information may be described by a URL (referred to as Uniform Resource Locator) description method. In S757, the CPU 72 sends the first processed data reception command information to the multi-function peripheral 10.

In S759, the CPU 22 of the multi-function peripheral 10 sends first download source URL request information and the first processed data reception information request information to the mediation server 60. The first download source URL request information is information to request of the mediation server 60 a first download source URL to access first processed data for which first data processing completion confirmation was executed in S631. Further, the first processed data reception information request information is information to request of the mediation server 60 first processed data reception information for identifying a job which generated the first processed data for which the data processing completion confirmation was executed in S631. In S761, the CPU 72 generates the first download source URL and the first processed data reception information, and sends the first download source URL and the first processed data reception information to the multi-function peripheral 10.

In S763, download request information to download the first processed data identified by the first processed data reception information is sent to the data processing server 200 by the CPU 22 of the multi-function peripheral 10. In S765, the CPU 272 of the data processing server 200 sends the first processed data specified by the download request information to the multi-function peripheral 10.

In the data processing server 200, when the first data processing is executed for 100 KB at a time, in S765 the processed data may be sent 100 KB at a time to the multi-function peripheral 10 in response to the download request information sent in S763. In this case, the CPU 22 of the multi-function peripheral 10 may repeat the sending of the download request information of S763, and repeat the receiving of the first processed data of S765 until the minimum data amount which can undergo print processing by the print executing unit has been received. The minimum data amount which can undergo print processing by the print executing unit may be an amount sufficient to cause one carriage pass of an ink head in case the print executing unit 18 is an ink jet printer, and an amount sufficient to print one page of printing paper in case the print executing unit 18 is a laser printer.

In S767, the CPU 22 of the multi-function peripheral 10 causes the print executing unit 18 to execute the first print process. Thus, a print result as illustrated in the first print result 301 (see FIG. 18) can be obtained. The first print process may be executed using a smallest printable unit of the print data. For example, in case the print executing unit 18 is the ink jet printer, the print process may be executed in units of lines. In case the print executing unit 18 is the laser printer, the print process may be executed in one page units of printing paper.

When the first print process is complete, in S769 the CPU 22 sends first print completion notification information, indicating that the print process has been completed, to the mediation server 60.

Processing contents of a second print processing period P2 (S1615 to S1769) will be described. The second print processing period P2 is a period for executing the second print process. In S1615, the CPU 72 generates second print mode selection screen data for causing a second print mode selection screen 213 to be displayed, and generates second print parameter setting screen data for causing a second print parameter setting screen 220 to be displayed. In S1617, the CPU 72 sends the second print mode selection screen data and the second print parameter setting screen data to the multi-function peripheral 10.

Figure 13:
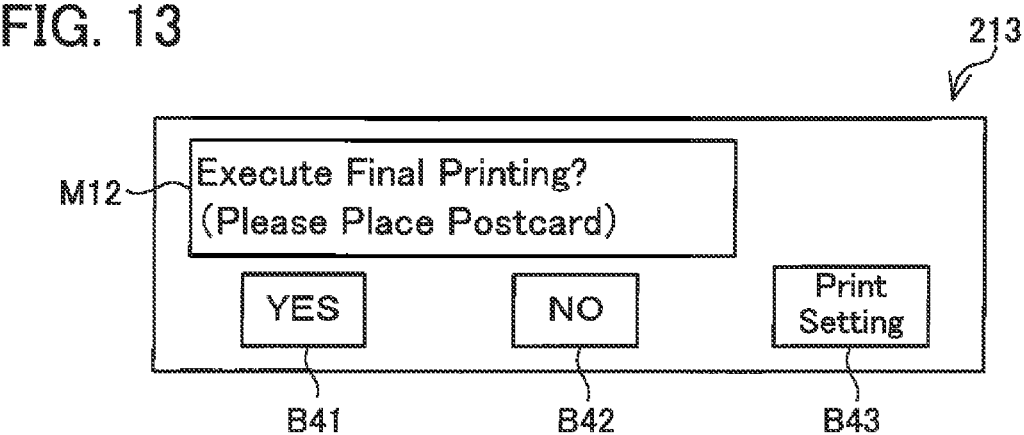
FIG. 13 shows an example of a second print mode selection screen display.

When receiving the second print mode selection screen data and the second print parameter setting screen data from the mediation server 60, in S1619 the CPU 22 of the multi-function peripheral 10 causes the second print mode selection screen 213 to be displayed on the display unit 14. FIG. 13 shows an example of the second print mode selection screen 213. The second print mode selection screen 213 includes a message image M12 and button images B41 to B43. The message image M12 is an image for requesting the user to select whether to execute the second print process, which is final printing. The button images B41 and B42 are images for receiving selection of whether to execute the second print process.

Figure 14:
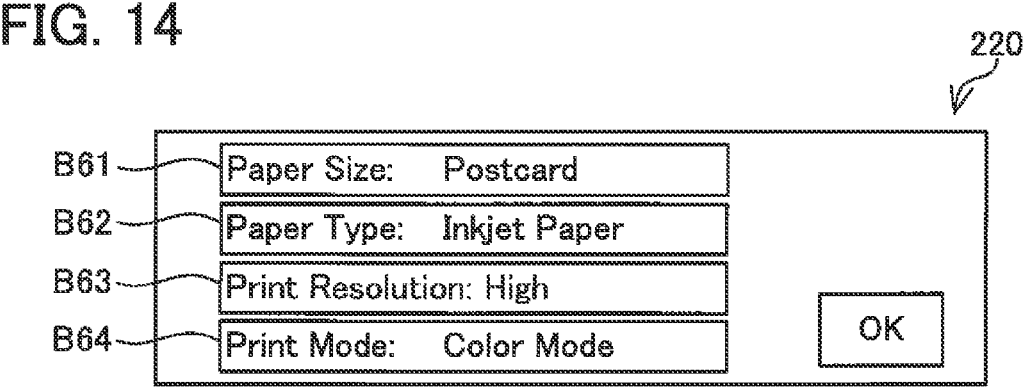
FIG. 14 shows an example of a second print parameter setting screen display.

The button image B43 is an image for receiving instruction to cause the second print parameter setting screen to be displayed. When the button image B43 is selected, the second print parameter setting screen 220 shown in FIG. 14 is displayed. The second print parameter setting screen 220 is a screen for setting various print settings in the print process of the second processed data in S1767. The second print parameter setting screen 220 includes button images B61 to B64. The button images B61 to B64 are respectively images for receiving setting input of each of the print settings "printing paper size", "printing paper type", "print resolution" and "print mode".

When the user selects the button image B41 or B42 in the second print mode selection screen 213 in FIG. 13, in S1621 the CPU 22 sends, to the mediation server 60, second print mode identification information for identifying the instruction contents of the user, and a second print parameter. In S1623, the CPU 72 of the mediation server 60 determines whether the instruction contents of the user instruct execution of the second print process. When a negative determination is made (S1623: NO), the process proceeds to S2615, and when a positive determination is made (S1623: YES), the process proceeds to second data processing wait processing A2.

When executing the second data processing on the upload data, the second data processing wait processing A2 is a process causing the multi-function peripheral 10 to wait until the completion of the second data processing. The processing contents of the second data processing wait processing A2 are the same as the processing contents of the first data processing wait processing A1 described above (see S631 to S651). Hence, a detailed description to FIG. 5 will be omitted.

In S1660, the CPU 272 of the mediation server 60 sends the generated data number query information to the data processing server 200. The generated data number query information is information for enquiring, from the data processing server 200, about the number of pieces of second processed data that have been generated by the second data processing. In S1665, the CPU 272 receives, from the data processing server 200, second processed data generation number information indicating the number of pieces of second processed data that were generated.

The process of S1753 to S1769 is a process to cause the multi-function peripheral 10 to execute a print process using the second processed data generated by the second data processing. In S1753, the CPU 72 of the mediation server 60 generates second processed data reception command information. The second processed data reception command information is information indicating a command for causing the multi-function peripheral 10 to obtain the second processed data from the data processing server 200. Further, the second print parameter received from the multi-function peripheral 10 in S1621 and second processed number information are added to the second processed data reception command information. The second processed number information is the number of pieces of second processed data that undergoes the print process. The number of pieces of second processed data instructed by the second processed number information may be the same as the generated number of pieces of second processed data indicated in the second processed data generation number information received in S1665. Further, the second processed data reception command information may be described by a URL description method.

In S1757 the CPU 72 sends the second processed data reception command information to the multi-function peripheral 10. In S1759, the CPU 22 of the multi-function peripheral 10 sends second download source URL request information and the second processed data reception information request information to the mediation server 60. The second download source URL request information is information to request of the mediation server 60 a second download source URL to access second processed data. In S1761, the CPU 72 generates the second download source URL and the second processed data reception information, and sends the second download source URL and the second processed data reception information to the multi-function peripheral 10.

In S1763, download request information to download the second processed data identified by the second processed data reception information is sent to the data processing server 200 by the CPU 22 of the multi-function peripheral 10. In S1765, the CPU 272 of the data processing server 200 sends the second processed data specified by the download request information to the multi-function peripheral 10.

In S1767, the CPU 22 of the multi-function peripheral 10 causes the print executing unit 18 to execute the second print process. Thus, a print result as illustrated in the second print result 302 (see FIG. 19) can be obtained. When the second print process is complete, in S1769 the CPU 22 sends second print completion notification information, indicating that the print process has been completed, to the mediation server 60.

Processing contents of a saving processing period P3 (S2615 to S2869) will be described. The saving processing period P3 is a period for executing the saving process. In S2615, the CPU 72 generates saving mode selection screen data for causing a saving mode selection screen 214 to be displayed. In S2617, the CPU 72 sends the saving mode selection screen data to the multi-function peripheral 10.

Figure 15:
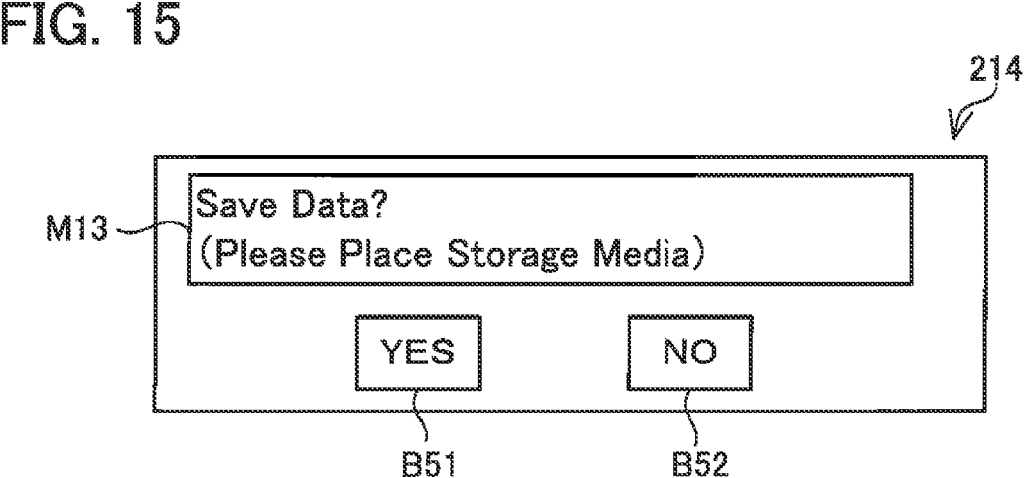
FIG. 15 shows an example of a saving mode selection screen display.

When receiving the saving mode selection screen data from the mediation server 60, in S2619 the CPU 22 of the multi-function peripheral 10 causes the saving mode selection screen 214 to be displayed on the display unit 14. FIG. 15 shows an example of the saving mode selection screen 214. The saving mode selection screen 214 includes a message image M13 and button images B51, B52. The message image M13 is an image for requesting the user to select whether to execute the saving process. The button images B51 and B52 are images for receiving selection of whether to execute the saving process.

When the user selects the button image B51 or B52, in S2621 the CPU 22 sends saving mode identification information for identifying the instruction contents of the user to the mediation server 60. In S2623, the CPU 72 of the mediation server 60 determines whether the instruction contents of the user instruct execution of the saving process. When a negative determination is made (S2623: NO), the process proceeds to S2867, and when a positive determination is made (S2623: YES), the process proceeds to third data processing wait processing A3.

When executing the third data processing on the upload data, the third data processing wait processing A3 is a process causing the multi-function peripheral 10 to wait until the completion of the third data processing. The processing contents of the third data processing wait processing A3 are the same as the processing contents of the first data processing wait processing A1 described above (see S631 to S651). Hence, a detailed description to FIG. 6 will be omitted.

In S2660, the CPU 272 of the mediation server 60 sends the generated data number query information to the data processing server 200. The generated data query information is information for enquiring, from the data processing server 200, about the number of pieces of third processed data that have been generated by the third data processing. In S2665, the CPU 272 receives, from the data processing server 200, third processed data generation number information indicating the number of pieces of third processed data that were generated.

The process of S2753 to S2769 is a process to cause the multi-function peripheral 10 to store the third processed data generated by the third data processing. In S2753, the CPU 72 of the mediation server 60 generates third processed data reception command information. The third processed data reception command information is information indicating a command for causing the multi-function peripheral 10 to obtain the third processed data from the data processing server 200. Further, third processed number information is added to the third processed data reception command information. The third processed number information is the number of pieces of third processed data that undergoes the saving process. The number of pieces of third processed data instructed by the third processed number information may be the same as the generated number of pieces of third processed data indicated in the third processed data generation number information received in S2665. Further, the third processed data reception command information may be described by a URL description method.

Since the processing contents executed in S2757 to S2765 are the same as the processing contents executed in S757 to S765 (see FIG. 4) as described above, a description thereof is omitted here. In S2767, the CPU 22 of the multi-function peripheral 10 executes the saving process. Specifically, the third processed data obtained from the data processing server 200 is stored in the memory 24. When the saving process is completed, in S2769 the CPU 22 sends saving completion notification information indicating that the saving process has been completed, to the mediation server 60. In S2867, the CPU 72 of the mediation server 60 sends processing completion notification information to the multi-function peripheral 10. In S2869, the CPU 22 of the multi-function peripheral 10 causes a completion screen to be displayed on the display unit 14. Thus, the flow ends.

Figure 7:
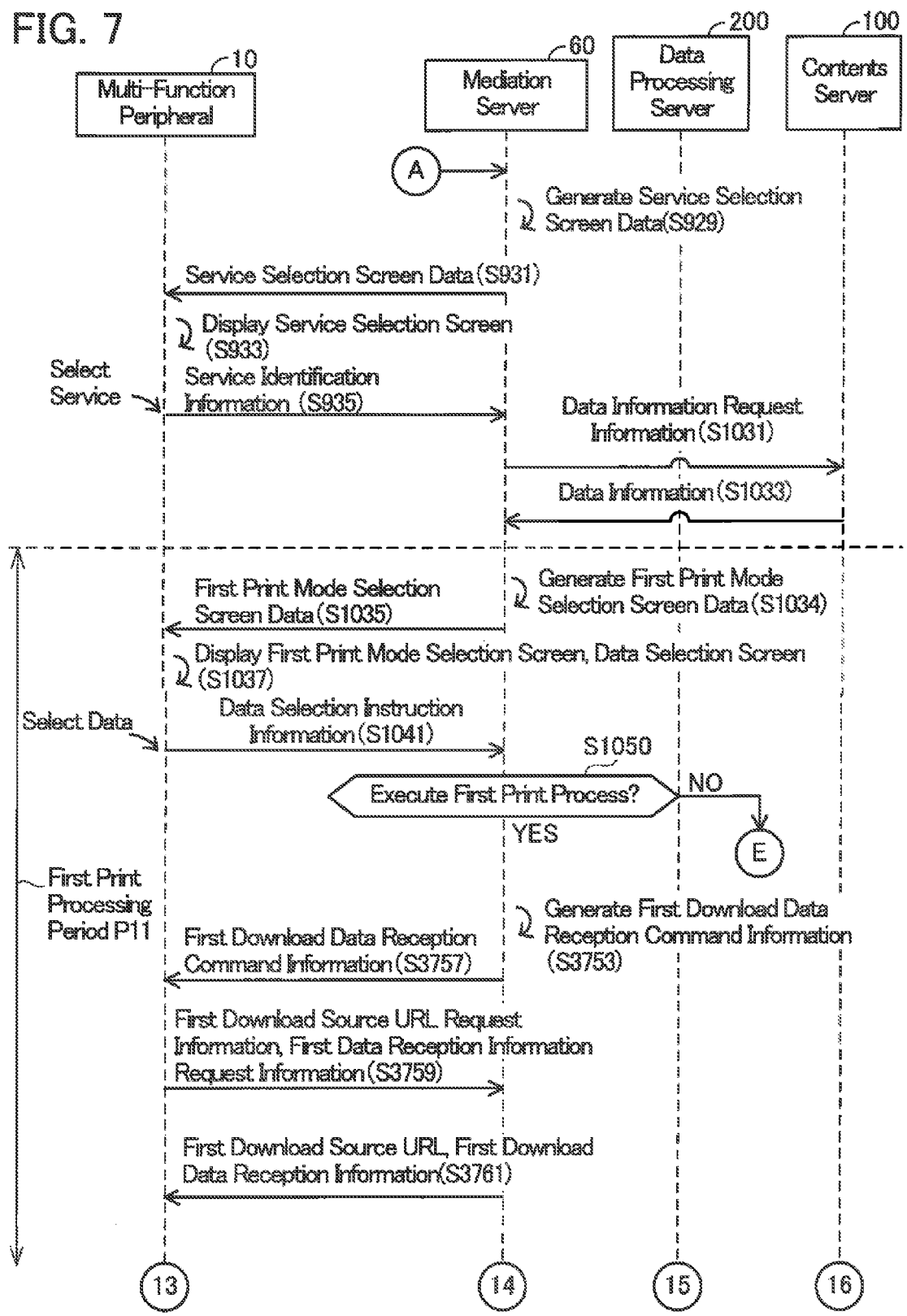
FIG. 7 shows a sequence diagram of various processing executed by each device.
Figure 8:
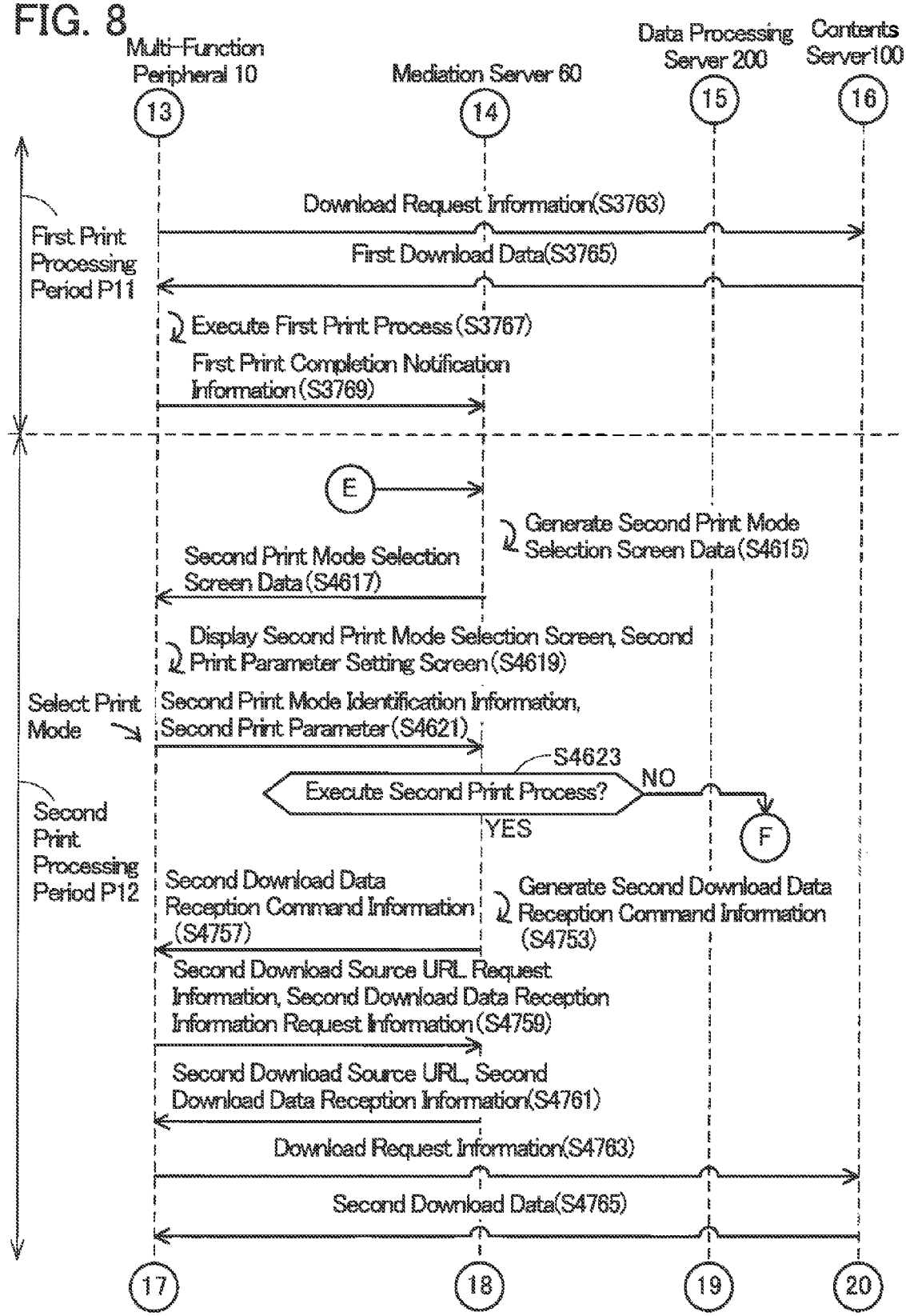
FIG. 8 shows a sequence diagram of various processing executed by each device.
Figure 9:
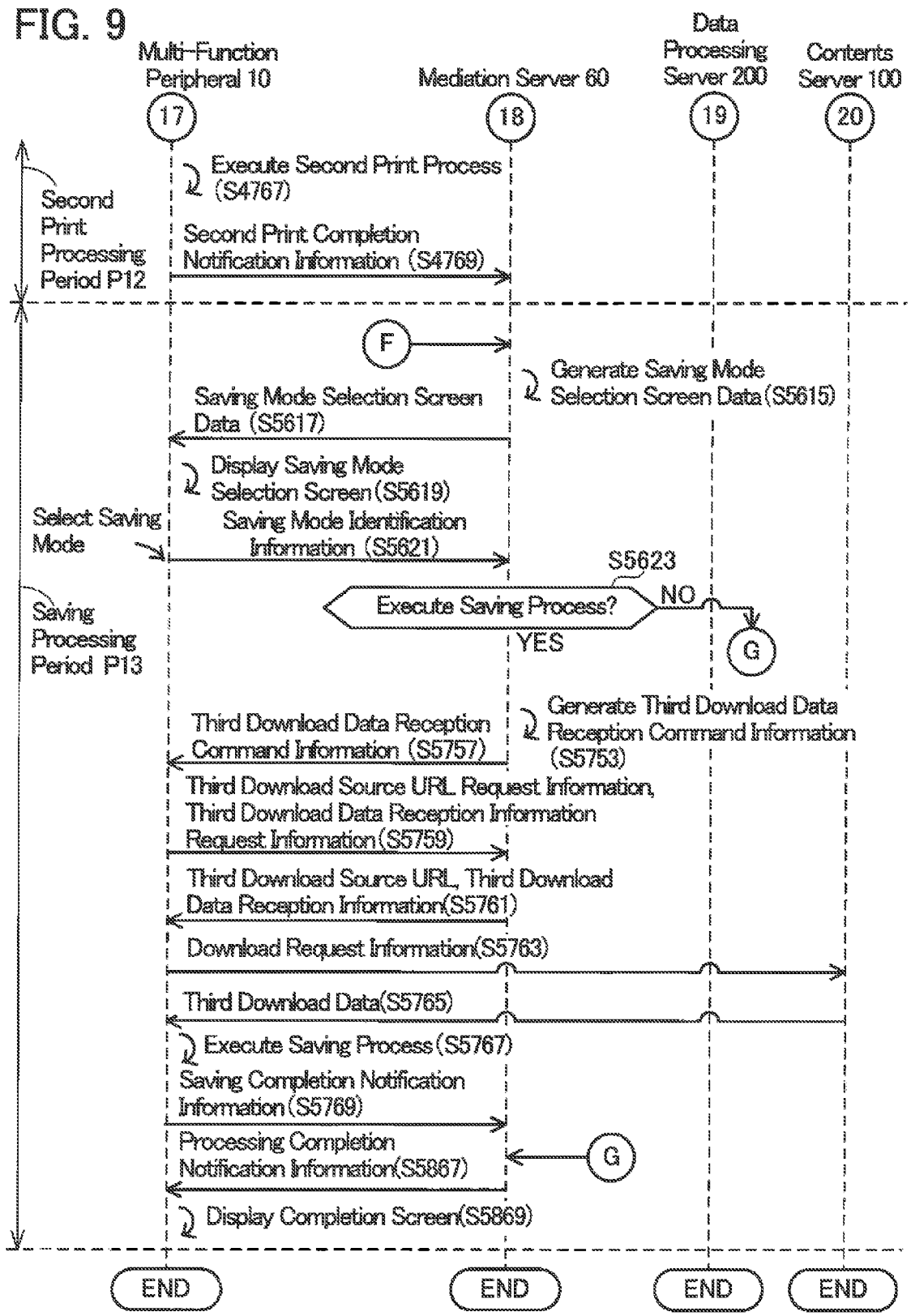
FIG. 9 shows a sequence diagram of various processing executed by each device.
Figure 16:
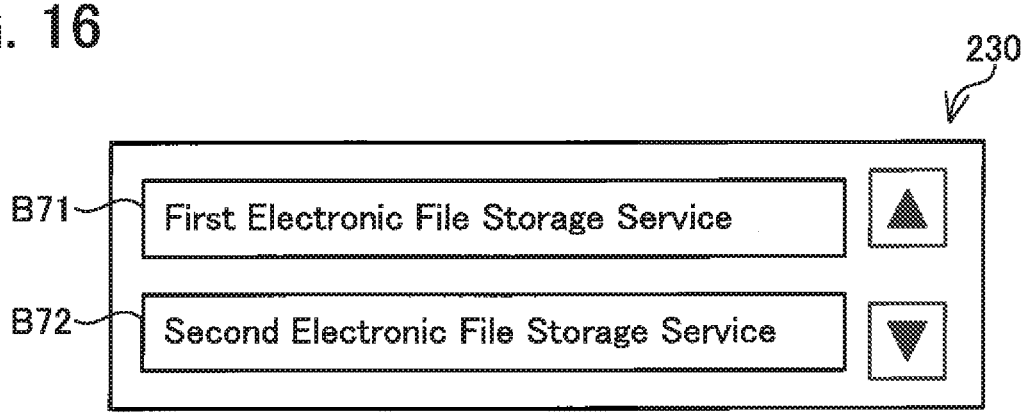
FIG. 16 shows an example of a service selection screen display.

On the other hand, in case the function identification information indicates download print (S514: download print) in S514 (see FIG. 2), the CPU 72 of the mediation server 60 proceeds to S929 (see FIG. 7). In S929, the CPU 72 of the mediation server 60 generates service selection screen data for causing a service selection screen 230 to be displayed. In S931, the CPU 72 sends the service selection screen data to the multi-function peripheral 10. In receiving the service selection screen data from the mediation server 60, in S933 the CPU 22 of the multi-function peripheral 10 causes the service selection screen 230 to be displayed on the display unit 14. Thereby, the CPU 22 receives the selection of service. As shown in FIG. 16, the service selection screen 230 includes button images B71 and B72.

By operating the operating unit 12, the user selects a button image, from the service selection screen 230, representing a contents server which is to upload the data. In the present embodiment, the description will continue using, as an example, a case that the user selects the button image B71 (i.e., the contents server 100). In S935, the CPU 22 sends service identification information corresponding to the button image selected by the user to the mediation server 60. In the illustrative example of the present embodiment, service identification information including a server name "Server 100" is sent to the mediation server. That is, the service identification information may be information indicating the selected button.

In S1031, the CPU 72 sends data information request information to the contents server 100. The data information request information is information for requesting data information. The data information is information to identify each of the plurality of data that is being stored in the selected contents server. A file name is an example of the data information. In receiving the data information request information from the mediation server 60, in S1033 the contents server 100 sends the data information to the mediation server 60.

Processing contents of a first print processing period P11 (S1034 to S3769) will be described. The first print processing period P11 is a period for executing the first print process using download data. In S1034, based on the data information received in S1033, the CPU 72 of the mediation server 60 generates the first print mode selection screen data for causing a first print mode selection screen 212a and a data selection screen to be displayed. In S1035, the CPU 72 sends the first print mode selection screen data to the multi-function peripheral 10.

Figure 17:
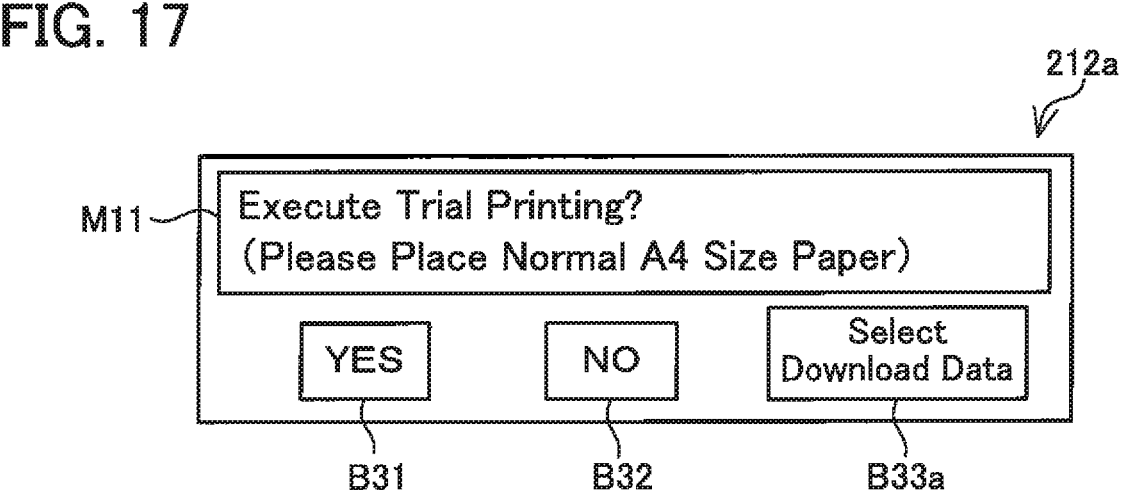
FIG. 17 shows an example of the first print mode selection screen display.

When receiving the first print mode selection screen data from the mediation server 60, in S1037 the CPU 22 of the multi-function peripheral 10 causes the first print mode selection screen 212a to be displayed on the display unit 14. FIG. 17 shows an example of the first print mode selection screen 212a. The first print mode selection screen 212a includes the message image M11 and button images B31, B32, B33a. The contents of the message image M11 and the button images B31 and B32 have already been described using FIG. 12, and consequently a description thereof is omitted here. The button image B33a is an image for receiving an instruction to cause the data selection screen to be displayed. If the button image B33a is selected, a data selection screen (not shown) is displayed on the display unit 14. The data selection screen is a screen for causing the user to select data to be downloaded. Then, the CPU 22 receives a process for selecting selected data from among the plurality of pieces of data stored in the contents server 100. The selected data is data selected from the contents server 100 as the download target. The CPU 22 may receive a process for selecting a plurality of pieces of selected data. The user operates the operating unit 12 to select a button image for accessing the data selected for download from the data selection screen. A button image displayed to include an image data file name is an example of the button image for accessing the data selected for download. The button image may be displayed to include a thumbnail of image data corresponding to the button.

When the user selects the button image B31 or B32 in the first print mode selection screen 212a in FIG. 17, in S1041 the CPU 22 sends, to the mediation server 60, data selection instruction information corresponding to the button image selected by the user. The data selection instruction information is information for identifying the selected data. The data selection instruction information may be described by a URL description method. In S1050, the CPU 72 of the mediation server 60 determines whether the instruction contents of the user instruct execution of the first print process. When a negative determination is made (S1050: NO), the process proceeds to S4615, and when a positive determination is made (S1050: YES), the process proceeds to S3753. The processing contents executed in each of S3753 to S3769 are the same as processing contents executed in each of S753 to S769 (see FIG. 4) described above, and consequently a description thereof is omitted here.

Processing contents of a second print processing period P12 (S4615 to S4769) will be described. The second print processing period P12 is a period for executing the second print process using the download data. The processing contents executed in each of S4615 to S4769 are the same as processing contents executed in each of S1615 to S1769 (see FIG. 5) described above, and consequently a description thereof is omitted here.

Processing contents of a saving processing period P13 (S5615 to S5869) will be described. The saving processing period P3 is a period for executing the saving process using the download data. The processing contents executed in each of S5615 to S5869 are the same as processing contents executed in each of S2615 to S2869 (see FIG. 6) described above, and consequently a description thereof is omitted here.

(Effect)

In the communication system 2 described in the present specification, it is possible to cause the display unit 14 of the multi-function peripheral 10 to display (S619, S1619) the first print mode selection screen 212 for receiving whether or not to execute the first print process (see FIG. 12), or the second print mode selection screen 213 for receiving whether or not to execute the second print process (see FIG. 13). Thus, it is possible to cause the user to execute a plurality of types of print process in a selectable manner.

By executing the first print process (S767), it is possible to confirm the print mode in the second print process before executing the second print process (S1767). Thus, the occurrence of printing failure in the second print process can be suppressed. Further, the first print process (S767) functions as a trial printing of the second print process (S1767). Consequently, the print resolution of the first print process can be lower than the print resolution of the second print process. Thus, processing time of the first print process, the amount of ink used in the first print process, etc. can be suppressed compared to the second print process. Further, the grade (e.g., normal paper) of the printing paper used in the first print process can be lower than the grade (e.g., inkjet paper) of the printing paper used in the second print process. Thus, print cost of the first print process can be suppressed compared to the second print process.

The mediation server 60 can set the first processed number information, which is added to the first processed data reception command information, to "1" regardless of the generated number of pieces of first processed data or the number of print copies in the second print process (S753). Thus, when a plurality of pieces of processed data is generated, or when the number of print copies is a plurality, it is possible in the first print process to execute the trial printing of one part for one of the plurality of pieces of processed data. Hence, it is possible to suppress the number of printed papers in the first print process.

It is possible to include, in the first print result 301 (see FIG. 18), the message image M21 in addition to the second print image G2 for confirming the processing mode in the second print process. Thus, the user can be made to recognize that the first print process and the second print process are different print processes, that the first print result 301 is a result generated by the first print process, and that the first print result 301 is a trial printing result for confirming the print mode in the second print process. Hence, it is possible to prevent the user from reversing the print processes. Further, the user can be made to recognize the method of positioning the printing paper when the second print process is to be executed. Hence, the occurrence of printing failure in the second print process can be suppressed.

It is possible to include the message image M22 in addition to the second print image G2 in the first print result 301 (see FIG. 18). Thus, the user can be made to recognize the printing direction of the image to be printed by the second print process, and consequently the occurrence of printing failure in the second print process can be suppressed.

The first to third data processings on the upload data can be executed by the data processing server 200 (S631 to S651, A2, A3). Thus, it is not necessary for the first to third data processings to be executed by the multi-function peripheral 10, and consequently the processing load of the multi-function peripheral 10 can be reduced.

It is possible to cause the multi-function peripheral 10 to download the download data from the contents server 100 and to execute the first and the second print processes and the saving process (S3767, S4767, S5767). Thus, it is possible to cause the multi-function peripheral 10 to execute processing using various download data.

The data processings (S631 to S651, A2, A3) on the image data generated by the document being read by the multi-function peripheral 10 (S565) can be executed by the data processing server 200, which is an external device of the multi-function peripheral 10. Then, the multi-function peripheral 10 can be caused to execute the first and the second print processes and the saving process using the processed data which has undergone the data processing (S3767, S4767, S5767). Thus, it is possible to execute the first and the second print processes and the saving process on the scan data which has undergone various processing.

In the data processing server 200, it is possible to execute parallel processing of the three processings which are the first to third data processings, on the upload data which is in common (S601, S605, S609). Thus, the time required to complete all of the first to third data processings can be reduced.

The second print parameter setting screen 220 (see FIG. 14) can be displayed on the display unit 14 of the multi-function peripheral 10 (S1619), and the second print parameter setting screen 220 can receive the input of various print settings in the print process of the second processed data. Thus, the print mode can be confirmed by the first print process (S767), and the confirmation result can be reflected in the second print process (S1767). Hence, the second print process can be executed in the manner intended by the user.

The CPU 72 of the mediation server 60 adds the first print parameter stored in the print parameter storage area 76 to the first processed data reception command information (S753). Thus, it is possible to cause the multi-function peripheral 10 to execute the first print process using the predetermined print setting (S753). Since it is not necessary to cause the user to input the print setting of the first print process, convenience to the user can be increased.

The saving mode selection screen 214 (see FIG. 15) can be displayed on the display unit 14 of the multi-function peripheral 10 (S2619), and the saving mode selection screen 214 can receive the input of whether to execute the saving process. Then, when the instruction to execute the saving process has been input (S2623: YES), the third processed data obtained from the data processing server 200 can be stored in the memory 24 (S2767). Thus, it is possible to cause the user to obtain the processed data.

According to the relaying device, etc. described in the present specification, the contents servers 100 and 110 which store the data used in the first and the second print processes, and the mediation server 60 can be configured as separate entities. Thus, it is possible to prevent the mediation server 60 from being affected when editing or maintenance of the data used in the first and the second print processes is performed.

The data processing server 200 which executes the first to third data processings, and the mediation server 60 can be configured as separate entities. Thus, the processing load of the mediation server 60 can be reduced.

The first to third processed data reception command information (S757, S1757, S2757), the first to third download source URLs and the first to third processed data reception information (S761, S1761, S2761), the first to third processed data (S765, S1765, S2765), etc. can be obtained by the multi-function peripheral 10 by using a URL. Since a URL is a protocol that is generally used, it is possible to eliminate the need to provide a dedicated protocol for communication between the mediation server 60 and the multi-function peripheral 10.

The wait command can be sent to the multi-function peripheral 10 until the completion of the first to third data processings (the first data processing wait processing A1 to the third data processing wait processing A3). Thus, an error such as timeout can be prevented from occurring in the multi-function peripheral 10.

While specific embodiments of the present invention have been described in detail above, such description is for illustrative purposes only and is not intended to limit the scope and claims of the invention. Techniques described in the claims of the invention include various modifications and changes made to the specific examples illustrated above. Variants according to the above embodiments are listed below.

(First Variant)

Figure 20:
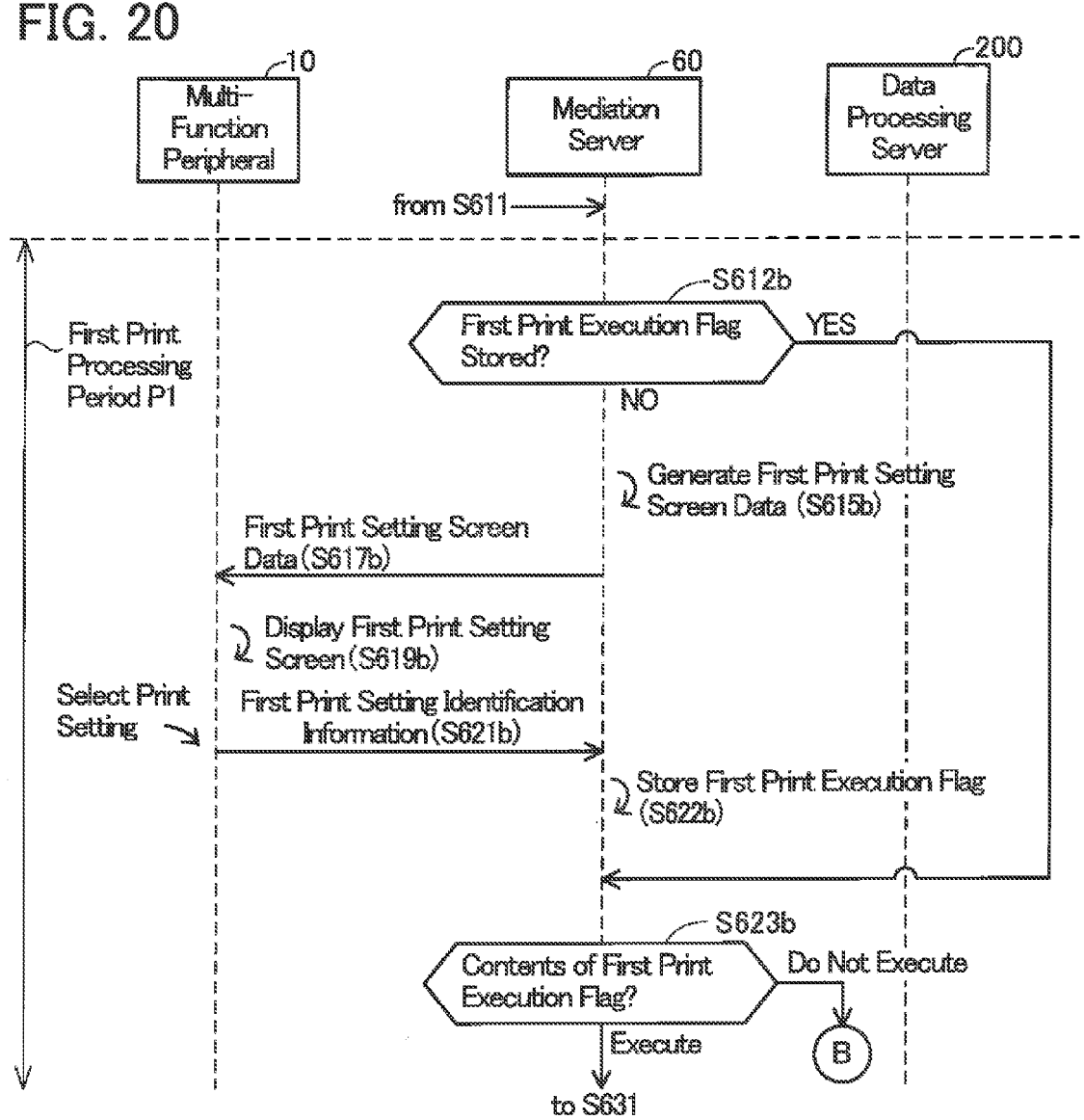
FIG. 20 shows a sequence diagram of various processing executed by each device.

The mode for causing the user to select whether to execute the first print process may vary. A setting of whether the first print process is to be executed may be stored by the mediation server 60. This will be described using the sequence diagram of FIG. 20. In S612b, the CPU 72 of the mediation server 60 determines whether a first print execution flag is being stored in the memory 74. The first print execution flag is information for storing the user instruction for whether the first print process is to be executed. When a positive determination is made (S612*b*: YES), the process proceeds to S623*b*, and when a negative determination is made (S612*b*: NO), the process proceeds to S615*b*.

Figure 21:
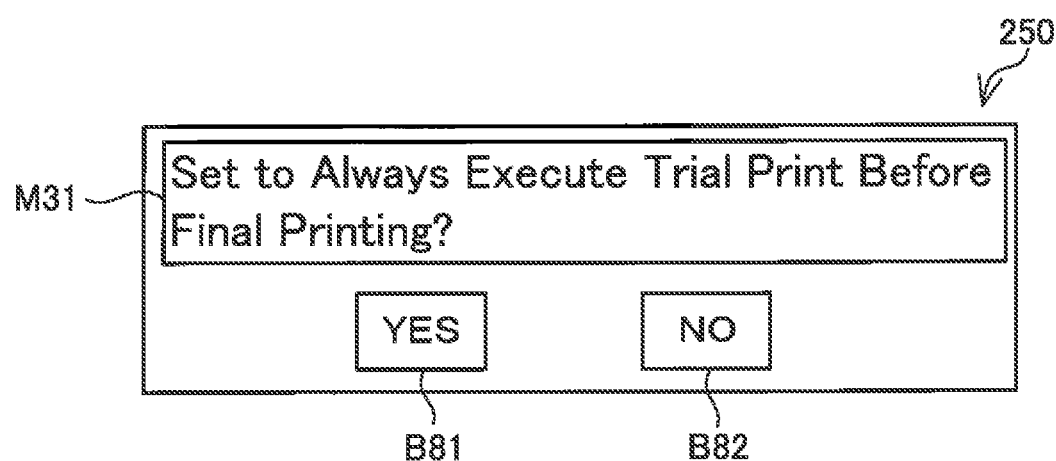
FIG. 21 shows an example of a first print setting screen display.

In S615*b*, the CPU 72 generates first print setting screen data for causing a first print setting screen 250 to be displayed. In S617*b*, the CPU 72 sends the first print setting screen data to the multi-function peripheral 10. In S619*b*, the CPU 22 of the multi-function peripheral 10 causes the first print setting screen 250 to be displayed on the display unit 14. FIG. 21 shows an example of the first print setting screen 250. The first print setting screen 250 includes a message image M31 and button images B81, B82. The message image M31 is an image for requesting the user to select a setting of whether to always execute the first print process. The button images B81 and B82 are images for receiving selection of whether to perform the setting.

The user operates the operating unit 12 to select the button image B81 or B82. In S621*b*, the CPU 22 sends first print setting identification information for identifying the instruction contents of the user to the mediation server 60. In S622*b*, the CPU 72 of the mediation server 60 stores the first print execution flag in the memory 74 in response to a user instruction.

In S623*b*, the CPU 72 determines the instruction contents of the first print execution flag. If the instruction contents are to execute the first print process (S623*b*: Execute), the process proceeds to S631 (see FIG. 4), and if the instruction contents are to not execute the first print process (S623*b*: Do Not Execute), the process proceeds to S1615 (see FIG. 5). Thus, since it is sufficient for the user to give the instruction once as to whether to execute the first print process, convenience to the user can be increased.

(Second Variant)

The setting of whether to execute the first print process may be stored in the multi-function peripheral 10. In this case, the first print execution flag described above may be stored in the memory 24. The first print execution flag may be MIB (referred to as Management Information Base) information which can be presented externally. Then, in S612*b* in FIG. 20 the CPU 72 of the mediation server 60 may query the multi-function peripheral 10 as to whether the first print execution flag is being stored in the memory 24 of the multi-function peripheral 10, and receive a query result from the multi-function peripheral 10. The CPU 72 may execute the determination of S612*b* or S623*b* based on the query result. Thus, since it is sufficient for the user to give the instruction once as to whether to execute the first print process, convenience to the user can be increased.

(Third Variant)

In the first print processing period P11 (S1034 to S3769), the first to third data processings may be executed on the download data. Specifically, when the mediation server 60 receives the data selection instruction information from the multi-function peripheral 10 (S1041), the mediation server 60 may download selected data indicated by the data selection instruction information from the contents server 100. Then, the mediation server 60 may upload the downloaded data to the data processing server 200. Subsequently, as described in S601 to S611, the mediation server 60 may request the execution of the first to third data processing to the data processing server 200. Then, as described for the first print processing period P1 to the saving processing period P3, the multi-function peripheral 10 may obtain the first to third processed data from the data processing server 200, and execute various processes. Thus, after the data processing has been executed on the data output from the contents servers 100 and 110, it is possible to cause the multi-function peripheral 10 to print or obtain the processed data. Since it is not necessary for the data processing to be executed in the multi-function peripheral 10, the processing load of the multi-function peripheral 10 can be reduced.

(Other Variants)

The first data processing wait processing A1 to the third data processing wait processing A3 can be omitted. Thus, generally speaking, it is sufficient for the relaying device to include at least "sending first screen information to the image processing device", "sending first print information to the image processing device" and "sending second print information to the image processing device". As a specific example, the relaying device may execute at least S617 or S617*b*, S757 or S761 or S765, and S1757 or S1761 or S1765.

An example has been described in which the second print parameter setting screen 220 in FIG. 14 is a different screen to the second print mode selection screen 213 in FIG. 13, but the screen is not limited to this form. The display contents of both screens may be displayed simultaneously in one screen.

An example has been described in which three data processings, i.e., the first to third data processings, are executed. However, the processing is not limited to this form, and the processing may be such that at least one data processing is executed. For example, the first print process (S767) and the second print process (S1767) may be executed using the first processed data generated by the first data processing.

The number of applications that is stored in the data processing server 200 is not limited to the three applications which are the A application 281 to the C application 283. The number of applications may be two or less, or four or more.

The data processing upload destination URL which the CPU 72 sends to the multi-function peripheral 10 in S579 is not limited to a URL of a data processing server 200 but a URL of a recording medium which the data processing server 200 can access.

In the present embodiment, a case was explained in which contents servers 100 and 110 are connected to the Internet 6; but three or more contents servers may be connected to the Internet 6.

In the embodiment, the case is described in which the CPUs 22, 72, and 272 of the multi-function peripheral 10, the mediation server 60, and the conversion server 200 execute processing according to software, but is not limited thereto. At least a part of functions provided according to the software may be provided by hardware such as a logic circuit.

The invention claimed is:

1. A relaying device comprising:
    a network interface configured to connect with a network;
    a processor coupled to the network interface; and
    a memory storing computer-readable instructions, the computer-readable instructions, when executed by the processor, causing the relaying device to perform:
        sending, to an image processing device via the network interface, first screen information for causing a first screen to be displayed on a display unit of the image processing device which is connected with the network,
            the first screen information including an instruction to display the first screen for receiving selection as to whether to execute a first print process or a second print process at the image processing device, the second print process being a process using print information received from the network by the image processing device, and the first print process being performed prior to the second print process;
        sending first print information used for the first print process to the image processing device via the network interface in a case that first process-identification information indicating execution of the first print process is received via the network interface from the image processing device, after sending the first screen information; and sending second print information used for the second print process to the image processing device via the network interface in a case that second process-identification information indicating execution of the second print process is received via the network interface from the image processing device, after sending the first screen information.

2. The relaying device as in claim 1, wherein the computer-readable instructions cause the relaying device to perform:

after sending the first print information, in a case that information indicating completion of the first print process has been received from the image processing device via the network interface, sending second screen information for causing a second screen to be displayed on the display unit of the image processing device to the image processing device via the network interface, the second screen being configured to receive selection as to whether to execute the second print process at the image processing device; and after sending the second screen information, in a case that second process identification information indicating execution of the second print process is received via the network interface from the image processing device, sending second print information used for the second print process to the image processing device via the network interface.

3. The relaying device as in claim 1, wherein in the case that first process-identification information indicating execution of the first print process is received from the image processing device, the first print information used for the first print process is sent to the image processing device, the first print information including information for a trial print process having a lower printing quality than a printing quality of the second print process.

4. The relaying device as in claim 1, wherein in the case that first process-identification information indicating execution of the first print process is received from the image processing device, the first print information used for the first print process is sent to the image processing device, the first print information including information for a trial print process to print an image on a different type of paper from a type of paper printed on by the second print process.

5. The relaying device as in claim 1, wherein in the case that first process-identification information indicating execution of the first print process is received from the image processing device, the first print information used for the first print process is sent to the image processing device, the first print information including information for a trial print process to print one image from among a plurality of images to be printed by the second print process.

6. The relaying device as in claim 1, wherein in the case that first process-identification information indicating execution of the first print process is received from the image processing device, the first print information used for the first print process is sent to the image processing device, the first print information including information for a process to print one or more of additional image with an image to be printed by the second print process.

7. The relaying device as in claim 1, wherein the computer-readable instructions cause the relaying device to perform:

generating first image information that is a base of an image to be printed by the first print process;

sending the generated first image information as the first print information;

generating second image information that is a base of an image to be printed by the second print process and is different from the first image information; and sending the generated second image information as the second print information.

8. The relaying device as in claim 1, wherein the computer-readable instructions cause the relaying device to perform:

sending first request command information for causing the image processing device to send first demand information as the first print information, the first image information being a base of an image to be printed by the first print process, the first demand information demanding the image processing device to send the first image information to the relaying device;

after sending the first request command information, in a case that the first demand information is received from the image processing device via the network interface, sending the first image information to the image processing device via the network interface;

sending second request command information for causing the image processing device to send second demand information as the second print information, the second image information being a base of an image to be printed by the second print process and being different from the first image information, the second demand information demanding the image processing device to send the second image information to the relaying device; and after sending the second request command information, in a case that the second demand information is received from the image processing device via the network interface, sending the second image information to the image processing device via the network interface.

9. The relaying device as in claim 7, wherein the computer-readable instructions cause the relaying device to perform:

sending third screen information for causing a third screen to be displayed on the display unit to the image processing device via the network interface, the third screen information including an instruction to display the third screen for accepting input of image designating information designating pre-processing image information;

generating the first image information in a case that the image designating information is received from the image processing device via the network interface, after sending the third screen information, the generating of the first image information being executed by performing a first image processing to pre-processing image information designated by the image designating information received from the image processing device; and generating the second image information by performing a second image processing to the received pre-processing image information, the second image processing being different from the first image processing.

10. The relaying device as in claim 7, wherein the computer-readable instructions cause the relaying device to perform:
sending read-instruction information instructing reading of a draft to the image processing device via the network interface;
generating the first image information in a case that the pre-processing image information is received from the image processing device via the network interface, after sending the read-instruction information,
the generating of the first image information being executed by performing a first image processing to received pre-processing image information; and
generating the second image information by performing a second image processing to the received pre-processing image information, the second image processing being different from the first image processing,
wherein the pre-processing image information subject to the first image processing and the pre-processing image information subject to the second image processing are identical.

11. The relaying device as in claim 9, wherein the computer-readable instructions cause the relaying device to perform:
sending fourth screen information for causing a fourth screen to be displayed on the display unit to the image processing device via the network interface,
the fourth screen information including an instruction to display the fourth screen for receiving selection on which image processing is to be performed from among several kinds of image processings performed to the pre-processing image information;
generating the second image information in a case that image processing identification information indicating which image processing is to be performed is received from the image processing device via the network interface,
the generating of the second image information being executed by performing an image processing indicated by the image processing identification information as the second image processing to the pre-processing image information; and
generating the first image information by performing an image processing as the first image processing on the pre-processing image information,
the image processing being an image processing for obtaining image information for trial printing of the second image information and different from the second image processing.

12. The relaying device as in claim 1, wherein the computer-readable instructions cause the relaying device to perform:
sending, as the first print information, a first print parameter for instructing several kinds of print settings regarding the first print process; and
sending, as the second print information, a second print parameter for instructing several kinds of print settings regarding the second print process, the second print parameter being different from the first print parameter.

13. The relaying device as in claim 1, wherein the computer-readable instructions cause the relaying device to perform:
sending fifth screen information via the network interface, in a case that information indicating completion of the first print process is received from the image processing device via the network interface,
the fifth screen information causes a fifth screen to be displayed on the display unit to the image processing device,
the fifth screen information including an instruction to display the fifth screen for accepting an input of second print setting information regarding a print setting of the second print process; and
sending the print parameter as the second print information in a case that the second print setting information is received from the image processing device via the network interface, after sending the fifth screen information,
the print parameter being a print parameter for instructing several kinds of print settings regarding the second print process and having been generated according to the second print setting information.

14. The relaying device as in claim 1, further comprising:
a storage unit configured to store the pre-determined first print parameter for instructing several kinds of print settings regarding the first print process,
wherein the computer-readable instructions cause the relaying device to perform sending the first print parameter stored in the storage unit as the first print information in a case that first process identification information indicating execution of the first print process is received from the image processing device via the network interface.

15. The relaying device as in claim 1, further comprising:
a first server device; and
a mediation server,
wherein
the first server device comprises a first network interface configured to connect with the network and is configured to store the first print information and the second print information,
the mediation server comprises:
a second network interface configured to connect with the network; and
a mediation server processor coupled to the second network interface, wherein the computer-readable instructions cause the mediation server to perform:
sending, to the image processing device via the second network interface, first reception command information for requesting the image processing device to receive the first print information from the first server device; and
sending, to the image processing device via the second network interface, second reception command information for requesting the image processing device to receive the second print information from the first server device.

16. The relaying device as in claim 9, further comprising:
a second server device; and
a mediation server,
wherein
the second server device comprises a third network interface configured to connect with the network and is configured to perform the select image processing,
the mediation server comprises:
a second network interface configured to connect with the network; and
a mediation server processor coupled to the second network interface, wherein the computer-readable instructions cause the mediation server to perform:

sending output control information to the image processing device via the second network interface, the output control information being for causing the image processing device to send the pre-processing information to the second server device;

sending, to the image processing device via the second network interface, first reception command information for commanding the image processing device to receive the first print information from the second server device; and sending, to the image processing device via the second network interface, second reception command information for commanding the image processing device to receive the second print information from the second server device.

17. A non-transitory computer-readable storage medium storing computer-readable instructions for a relaying device, the computer-readable instructions, when executed by a processor of the relaying device, causing the relaying device to perform:

sending, to an image processing device via a network interface that is provided in the relaying device and is configured to connect with a network, first screen information for causing a first screen to be displayed on a display unit of the image processing device which is connected with the network, the first screen information including an instruction to display the first screen for receiving selection as to whether to execute a first print process or a second print process at the image processing device, the second print process being a process using print information received from the network by the image processing device, and the first print process being performed prior to the second print process;

sending first print information used for the first print process to the image processing device via the network interface in a case that first process-identification information indicating execution of the first print process is received via the network interface from the image processing device, after sending the first screen information; and sending second print information used for the second print process to the image processing device via the network interface in a case that second process-identification information indicating execution of the second print process is received via the network interface from the image processing device, after sending the first screen information.

18. The non-transitory computer-readable storage medium as in claim 17, wherein the computer-readable instructions cause the relaying device to perform:

after sending the first print information, in a case that information indicating completion of the first print process has been received from the image processing device via the network interface, sending second screen information for causing a second screen to be displayed on the display unit of the image processing device to the image processing device via the network interface, the second screen being configured to receive selection as to whether to execute the second print process at the image processing device; and after sending the second screen information, in a case that second process identification information indicating execution of the second print process is received via the network interface from the image processing device, sending second print information used for the second print process to the image processing device via the network interface.

19. A system comprising an image processing device and a relaying device, the image processing device comprising:
a first network interface configured to connect with a network; and
a control device coupled to the first network interface, the relaying device comprising:
a second network interface configured to connect with the network;
a processor coupled to the second network interface; and
a memory storing computer-readable instructions, wherein the computer-readable instructions, when executed by the processor, cause the relaying device to perform:

sending, to the image processing device via the second network interface, first screen information for causing a first screen to be displayed on a display unit of the image processing device, the first screen information including an instruction to display the first screen for receiving selection as to whether to execute a first print process or a second print process at the image processing device, the second print process being a process using print information received from the network by the image processing device, and the first print process being performed prior to the second print process;

the control device of the image processing device is configured to perform:

receiving the first screen information from the relaying device via the first network interface;

sending, to the relaying device via the first network interface, first process-identification information indicating execution of the first print process; and sending, to the relaying device via the first network interface, second process-identification information indicating execution of the second print process, the computer-readable instructions, when executed by the processor, further cause the relaying device to perform:

sending first print information used for the first print process to the image processing device via the second network interface in a case that the first process-identification information is received via the second network interface from the image processing device, after sending the first screen information; and sending second print information used for the second print process to the image processing device via the second network interface in a case that the second process-identification information is received via the second network interface from the image processing device, after sending the first screen information.

20. The system as in claim 19, wherein the computer-readable instructions cause the relaying device to perform:

after sending the first print information, in a case that information indicating completion of the first print process has been received from the image processing device via the second network interface, sending second screen information for causing a second screen to be displayed on the display unit of the image processing device to the image processing device via the second network interface, the second screen being configured to receive selection as to whether to execute the second print process at the image processing device; and after sending the second screen information, in a case that second process identification information indicating execution of the second print process is received via the second network interface from the image processing device, sending second print information used for the second print process to the image processing device via the second network interface.

* * * * *